United States Patent [19]
Ikeda et al.

[11] Patent Number: 5,323,305
[45] Date of Patent: Jun. 21, 1994

[54] LIGHT EMITTING POWER SUPPLY CIRCUIT

[75] Inventors: Takaaki Ikeda, 543-8, Oaza-minami, Ageo-shi, Saitama-ken; Toshihiko Suga, Kawasaki; Akihiko Kuroiwa, Yokohama, all of Japan

[73] Assignees: Daichi Co., Ltd.; Nihon Beam Electronics Co., Ltd., both of Tokyo; Takaaki Ikeda, Ageo, all of Japan

[21] Appl. No.: 768,847

[22] PCT Filed: Feb. 7, 1991

[86] PCT No.: PCT/JP91/00151

§ 371 Date: Oct. 7, 1991

§ 102(e) Date: Oct. 7, 1991

[87] PCT Pub. No.: WO91/12702

PCT Pub. Date: Aug. 22, 1991

[30] Foreign Application Priority Data

Feb. 7, 1990 [JP] Japan ..................... 2-27873
Mar. 9, 1990 [JP] Japan ..................... 2-59138

[51] Int. Cl.⁵ .................. H02M 7/523; H05B 33/08; G09F 9/00
[52] U.S. Cl. ......................... 363/98; 363/21; 363/132; 315/169.3; 315/291
[58] Field of Search ............ 363/17, 21, 56, 98, 363/132, 136; 315/291, 241 R, 246, 219, 169.3; H02M 7/523

[56] References Cited

U.S. PATENT DOCUMENTS

| | | | |
|---|---|---|---|
| 4,253,097 | 2/1991 | Hochstrate | 340/781 |
| 4,346,332 | 8/1982 | Walden | 315/307 |
| 4,833,584 | 5/1989 | Divan | 363/37 |
| 4,954,726 | 9/1990 | Lipman et al. | 307/46 |
| 5,027,040 | 6/1991 | Ikeda et al. | 315/241 R |
| 5,063,490 | 11/1991 | Maehara et al. | 363/37 |
| 5,066,895 | 11/1991 | Alessio | 315/226 |

FOREIGN PATENT DOCUMENTS

| | | |
|---|---|---|
| 0278253 | 8/1988 | European Pat. Off. . |
| 54-11643 | 1/1979 | Japan . |
| 59-152692 | 10/1984 | Japan . |
| 61-133600 | 6/1986 | Japan . |
| 62-49832 | 10/1987 | Japan . |
| 63-138691 | 6/1988 | Japan . |

*Primary Examiner*—Steven L. Stephan
*Assistant Examiner*—Adolf Berhane
*Attorney, Agent, or Firm*—Oblon, Spivak, McClelland, Maier & Neustadt

[57] ABSTRACT

A series coupled component partially includes a) a load circuit including an inductor and an EL or EL array having capacitive load characteristic, b) a load circuit including an inductor, a bipolar capacitor, and a diode circuit adapted to supply bidirectional current flows across an LED or LD, or c) a load circuit including an inductor, an EL or EL array having capacitive load characteristic, and the diode circuit. An inverter has coupling output terminals coupled to one end or both ends of the load circuit whereby an AC power inverted from a DC power source is supplied to the load circuit to operate at least one member of the EL, EL array, LED and LD. The inverter has a pair of positive and negative switches each comprising a zero-crossing switch mechanism adapted to automatically close its channel when the current becomes zero, the pair of positive and negative switches each being provided with a bypass channel having a reverse current bypass diode for bypassing the zero-crossing switch mechanism. Then every half cycle phase of the alternating current flow toward the load circuit is latched at a secondary zero-crossing phase point which is determined by circuit constants. This arrangement improves the efficacy of operating EL and similar elements, prevents heat release, and enables to operate such loads as EL having a large surface area with a compact operating device.

7 Claims, 23 Drawing Sheets

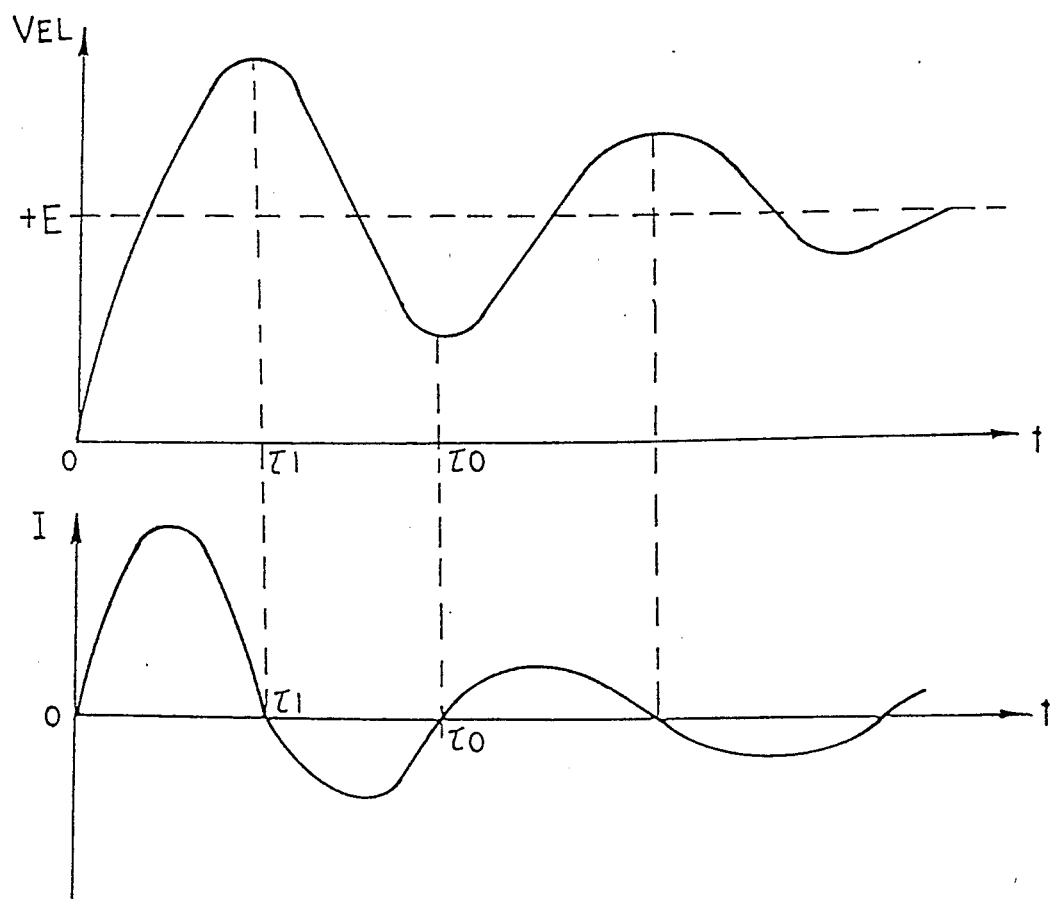

LIGHT EMITTING POWER SUPPLY CIRCUIT

FIELD OF THE INVENTION

This invention relates to a light emitting power supply circuit.

BACKGROUND OF THE INVENTION

There are known systems for operating electroluminescent (EL) elements, light emitting diodes (LED), and laser diodes (LD) by means of an inverter circuit for inverting DC power into AC power.

For example, systems for operating EL panels are widely used as back light of liquid-crystal panels as found in compact size liquid-crystal television receivers and lap-top computers having a liquid-crystal display built therein.

In the prior art, different EL operating devices are individually designed in accordance with the dimensions (surface area) of EL elements to be operated and lighting luminance. There exists no operating device which can accommodate singly for varying EL area and lighting luminance.

For long life (LL) inverters which are most popular in the prior art, there is used a system for operating an EL panel so as to follow a resonance frequency which is determined by the C value (electrostatic capacity) of the EL and the L value (inductance) of an inductor. The system is designed to compensate for a lowering of the EL luminance by, in response to a lowering of the luminance of EL due to a lowering of the C value thereof, increasing the resonance frequency and increasing the EL operating frequency in a follow-up manner to the resonance frequency.

However, this method has many problems in that the luminance of lighted EL is naturally determined by the resonance frequency of L and C, and it is difficult to fabricate a device for operating an EL panel having a large surface area. For example, the EL surface area corresponding to A-4 size (400 to 600 cm$^2$) is currently regarded the practically permissible maximum surface area.

Since it is necessary to switch a high current flow for operating EL panels having a large surface area, the switching loss associated therewith invites an increase of power loss and results in substantial heat release. Thus a heat sink is required as a heat dissipating measure, resulting in a larger size of the operating device.

Additionally, the electric charge accumulated in the EL can be coupled with the charge of the counter electrode, resulting in a power loss and a substantial loss of operating efficacy. For instance, even green color EL panels which are regarded best in operating efficacy show a luminous existence of at most about 1 lumen per watt.

SUMMARY OF THE INVENTION

A primary object of the present invention is to provide a light emitting power supply circuit capable of operating many types of loads and having high operating efficacy.

This and other objects are achieved by the present invention defined (1) below.

(1) A light emitting power supply circuit comprising a series coupled component partially including a) a load circuit including an inductor and an electroluminescent (EL) element or EL array having capacitive load characteristic, b) a load circuit including an inductor, a bipolar capacitor, and a diode circuit adapted to supply bidirectional current flows across an LED or LD, or c) a load circuit including an inductor, an EL or EL array having capacitive load characteristic, and said diode circuit, and an inverter having coupling output terminals coupled to one end or both ends of said load circuit wherein an AC power inverted from a DC power source is supplied to said load circuit to operate at least one member of the EL, EL array, LED and LD, wherein said inverter has a pair of positive and negative switches each comprising a zero-crossing switch mechanism adapted to automatically close its channel when the current becomes zero, said pair of positive and negative switches each being provided with a bypass channel having a reverse current bypass diode for bypassing the zero-crossing switch mechanism, whereby every half cycle phase of the alternating current flow toward said load circuit is latched at a secondary zero-crossing phase point which is determined by circuit constants.

The light emitting power supply circuit of the invention is designed such that the surplus power which is accumulated in the load such as an EL panel or passed through the load is recovered as reverse current. From the stand point of energy efficiency, the following four actions take place simultaneously.

(1) The surplus power which is accumulated in the EL panel or load as a surplus charge without being converted into light or which is simply passed through the load is recovered as reverse current, thereby inhibiting recombination of positive and negative charges, and eliminating or minimizing a power loss due to such charge recombination.

(2) The inductance acts to shift the phases of current and voltage, eliminating a switching loss.

A combination of a zero-crossing switch and a bypass channel in the form of a reverse bypass diode automatically provides a mechanism of recovering the reverse current, thereby automatically locking the current waveform of every half cycle. This eliminates a need for manually adjusting the duration of channel opening (ON) time in accordance with the surface area of EL panels or the type of load. Therefore, in addition to features (1) and (2), the present invention offers the third feature.

(3) Since the dynamism of the operating circuit automatically follows the size, type and other factors of the load, a single operating device can widely accommodate for different loads, for example, EL elements having different surface areas.

Since the load operating frequency and power source voltage can be regarded as exogenous variables for the dynamism of an LCR circuit in the operating circuit or as external parameters outside the system of the invention, a change of them gives no influence on the fundamental dynamism of the LCR circuit. No problem arises particularly when the load operating frequency is regarded as an external parameter.

Since the luminance of a lighted load depends the operating frequency and voltage, the present invention permits the luminance of a lighted load to be variably chosen by regulating the operating frequency and voltage without affecting the fundamental dynamism of the EL operating circuit. Therefore, in addition to features (1), (2) and (3), the present invention offers the fourth feature.

(4) The luminance of a lighted EL can be adjusted by variably regulating the operating frequency and voltage without affecting the dynamism of the EL operating circuit.

The circuit of the invention, when using first and second inverters and driving them in inverse synchronization relationship, can operate a load with a DC power source having a voltage which is one quarter of an AC voltage (peak-to-peak value) to be applied to the load, accomplishing efficient utilization of the power source voltage.

BRIEF DESCRIPTION OF THE DRAWINGS

FIG. 4 is a diagram showing an LCR series circuit.

FIG. 5 graphically illustrates how the voltage $V_{EL}$ and current I of capacitor C in the LCR series circuit vary with time.

DETAILED DESCRIPTION OF THE PREFERRED EMBODIMENTS

The present invention will described in detail in conjunction with its several preferred embodiments.

The light emitting power supply circuit of the invention has a light emitting section which includes a load having capacitive load characteristic, a load having resistance and/or diode characteristic, or a combination of such loads.

The load having capacitive load characteristic is an EL or the like.

The load having diode characteristic is a light emitting diode (LED), laser diode (LD) or the like.

Various lamps such as sodium lamps and mercury lamps as well as incandescent lamps may be used as the load having resistance characteristic.

In some cases, a plurality of loads of one or more types as mentioned above may be used in an array or row to constitute the light emitting section.

One embodiment in which the light emitting section is constituted by an EL panel which is a preferred example of the load having capacitive load characteristic is described below.

Figure 1:
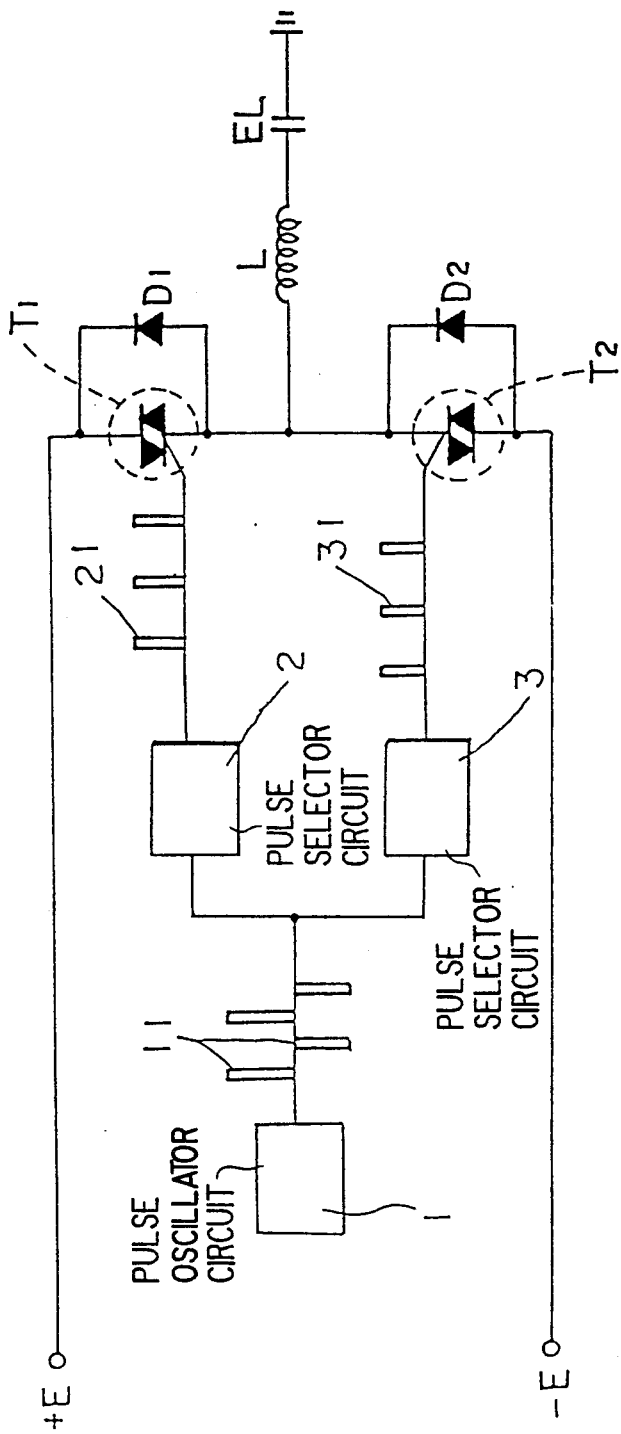
FIG. 1 is a diagram showing one embodiment of the light emitting power supply circuit according to the present invention.
Figure 2:
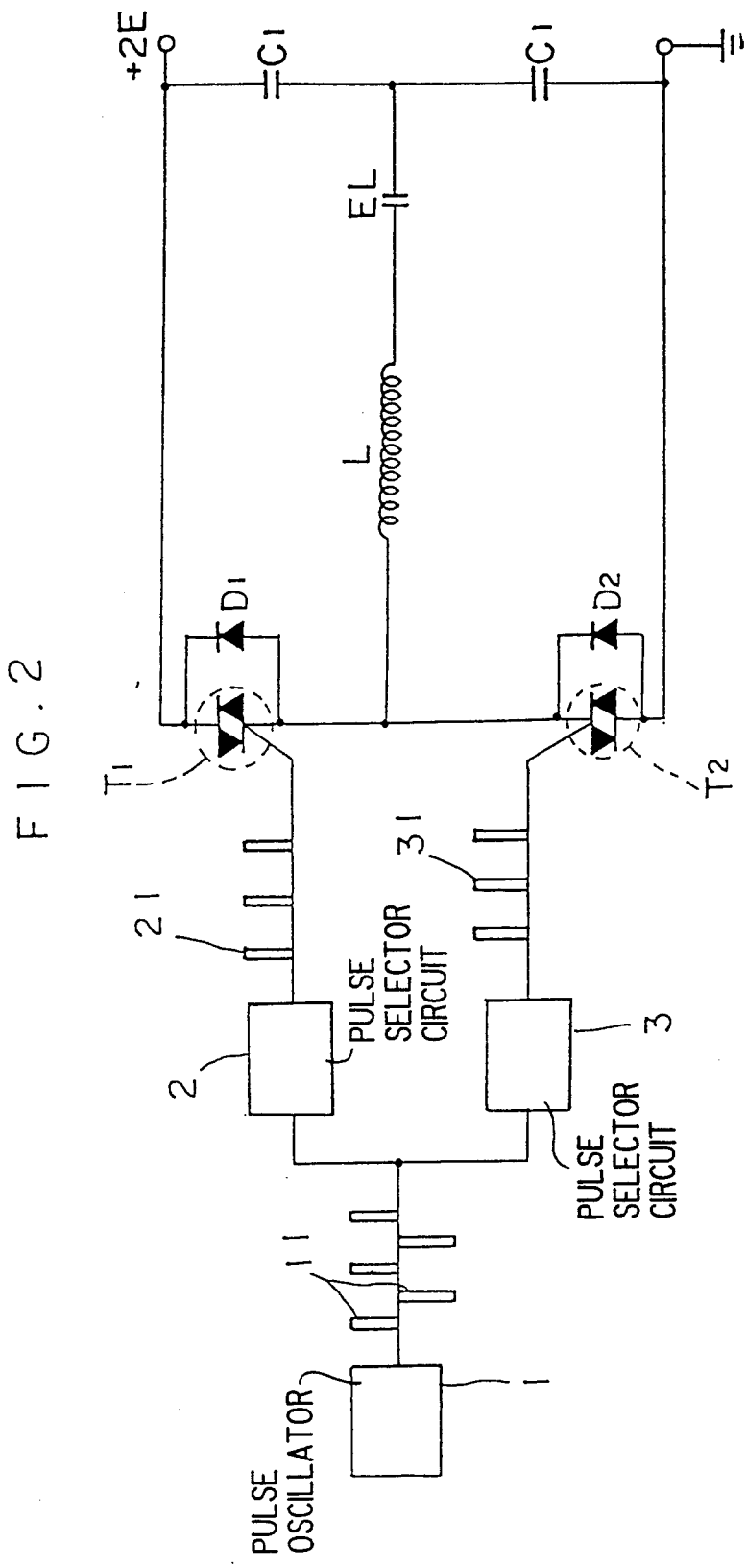
FIG. 2 is a diagram showing another embodiment of the light emitting power supply circuit according to the present invention.

The light emitting power supply circuits shown in FIGS. 1 and 2 each include a load circuit in the form of an LC circuit (more precisely, an LCR circuit) comprising a series connection of an EL panel EL and an inductor L. This load circuit may be one including EL panel EL and inductor L in at least a part of a series coupled component.

One end of the load circuit which is an LC or LCR circuit is coupled to a coupling output terminal of an inverter. The other end of the LC or LCR circuit may be coupled to an intermediate potential terminal of a DC input power source across the inverter or a ground terminal.

The EL panel EL is comprised of an EL element or an EL array which is usually a parallel connection of a plurality of EL elements.

In order that the circuit have a predetermined value of C, a bipolar capacitor may be connected in parallel with EL.

With respect to the order of coupling EL and L, either of them may be on the inverter side.

The light emitting power supply circuit of the invention is push-pull driven at a frequency f. In general, f ranges from about 50 Hz to about 600 Hz, EL has a capacitance of about 0.1 µF to about 10 µF, and L is about 30 mH to about 10 H.

The circuit shown in FIG. 1 and the circuit shown in FIG. 2 are different in the type of power source voltage.

The circuit shown in FIG. 1 has a DC power source of dual mode having a potential of ±E volt relative to the ground potential whereas the circuit shown in FIG. 2 has a DC power source of single mode having a potential of 2E volt relative to the ground potential. In the case of the single mode power source, a pair of capacitors C1, C1 having substantially equal capacity is provided for dividing the power source potential to provide an intermediate potential terminal.

In this embodiment, the pair of capacitors C1, C1 also serve as reverse power buffers.

The inverter of the light emitting power supply circuit of the invention includes a pair of positive and negative switches having a zero-crossing mechanism adapted to automatically close (or turn OFF) the channel when the current becomes zero.

The zero-crossing mechanism may be a zero-crossing switch element and/or a zero-crossing circuit.

In the illustrated embodiments, a pair of zero-crossing switches T1, T2 each consist of a zero-crossing switch element.

The inverter further includes bypass channels composed of a pair of reverse current bypassing diodes D1, D2 for bypassing a pair of zero-crossing switches T1, T2, respectively, and is connected to a DC input power source having ±E volt or 2E volt.

As long as the inverter used herein has the above-mentioned arrangement, no special limitation is imposed on the remaining arrangement which may be a well-known one. The zero-crossing switches T1, T2 are alternately opened (or turned ON) at a pulse oscillation frequency f equal to the switching frequency f.

The zero-crossing switch elements used as the zero-crossing switches T1, T2 may be thyristors having a withstand voltage of at least 2E volt, for example, reverse-blocking triode thyristors (SCR), bidirectional triode thyristors (triac), and photo thyristor couplers.

The electrical dynamism of such a circuit construction will be best understood by considering the LCR circuit shown in FIG. 4 in which the zero-crossing switch T1 of the inverter circuit is taken as a switch S.

In the circuit shown in FIG. 4, L represents the inductor, C represents the EL, and R represents a R equivalent component in the circuit. The R equivalent component includes sheet resistivity, switch element's ON resistance, coil's DC resistance, magnetic flux loss, EL's luminous flux dispersion, and the like.

As is well known in the art, the dynamics of the voltage $V_{EL}$ of C and the current flow I through the circuit after closing or turning on of the switch S in FIG. 4 develop an oscillatory phenomenon as shown in FIG. 5 if R is below a certain value.

For a mathematic model, assume that time constants determined by circuit constants L, C and R are $\tau_1$ and $\tau_0$ ($\tau_0 = 2\tau_1$). Assume angular frequency $\omega$ is $$\omega = \sqrt{1/LC - R^2/4L^2} ,$$

then $\tau_1$ is given by the equation:

$$\tau_1 = \sqrt{\pi/\omega} .$$

It will be understood that the oscillatory phenomenon appears when $R < 2\sqrt{L/C}$, and that R and the like include the ON resistance of inverter's switching elements and the like.

In the embodiments of the light emitting power supply circuit of the present invention, triac elements are used as the zero-crossing switches T1, T2.

As is well known in the art, once triac elements are turned ON (or opened), they do not resume OFF state (or closed) in response to a trigger (or gate) voltage of zero unless the current flow becomes zero.

Figure 6:
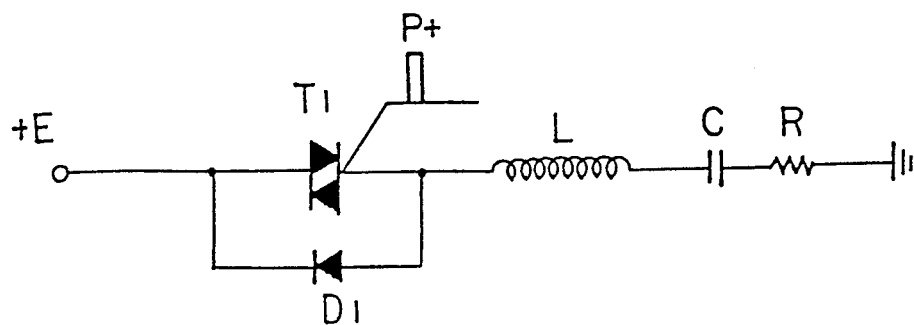
FIG. 6 is a diagram showing an LCR series circuit.
Figure 7:
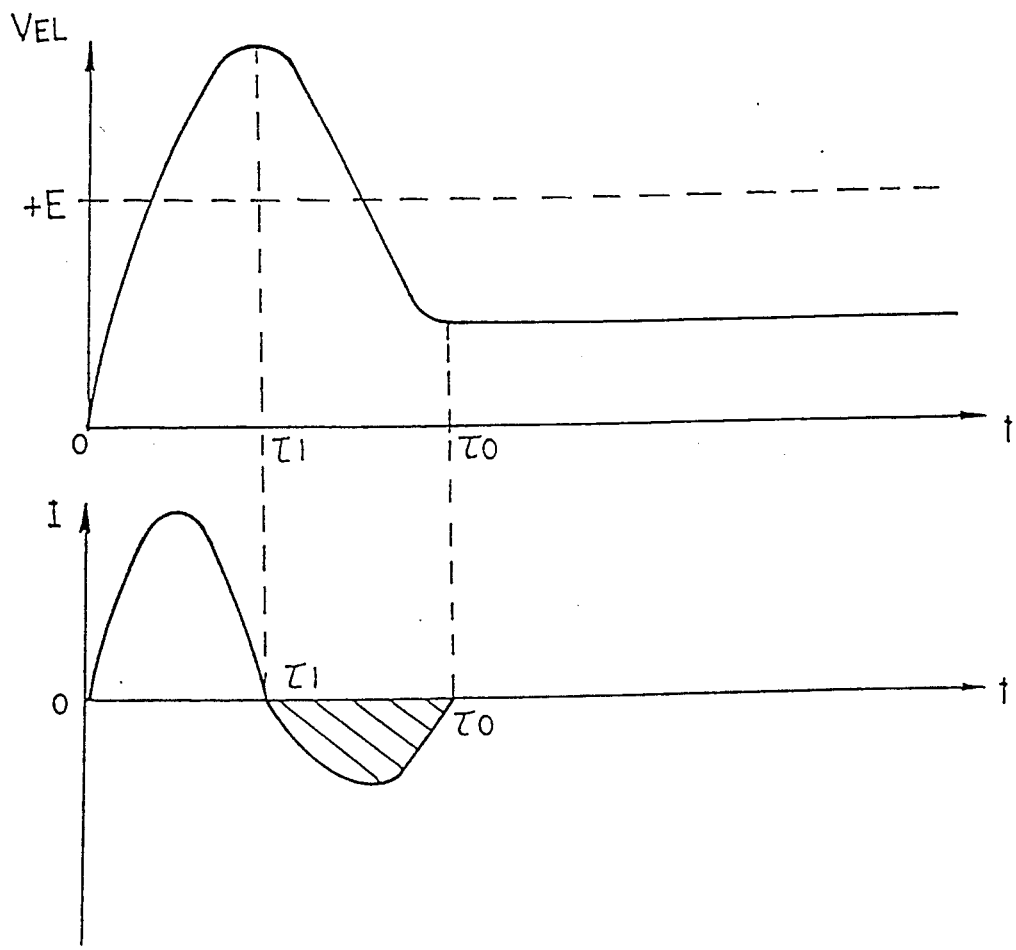
FIG. 7 graphically illustrates how the voltage $V_{EL}$ and current I of capacitor C in the LCR series circuit vary with time.

Consequently, in the LCR circuit shown in FIG. 6 in which the switch S is a triac element, if a pulsative trigger voltage is applied to the gate of T1 at t=0, then current I flows, and T1 is first turned OFF (or closed) at a point $\tau_1$ when current I becomes equal to zero and is not turned ON (or opened) thereafter until it receives a next trigger pulse. Then, for a duration $\tau_1 \leq t \leq \tau_0$ after the turning OFF of T1, the reverse current is recovered to the supply power source side through the bypass channel, and after $t = \tau_0$, re-charging-up current is inhibited by the action of the reverse bypass diode D1 in the bypass channel, eventually resulting in the current dynamism interrupted (latched or auto-locked) at point $\tau_0$ (secondary zero-crossing point).

Figure 8:
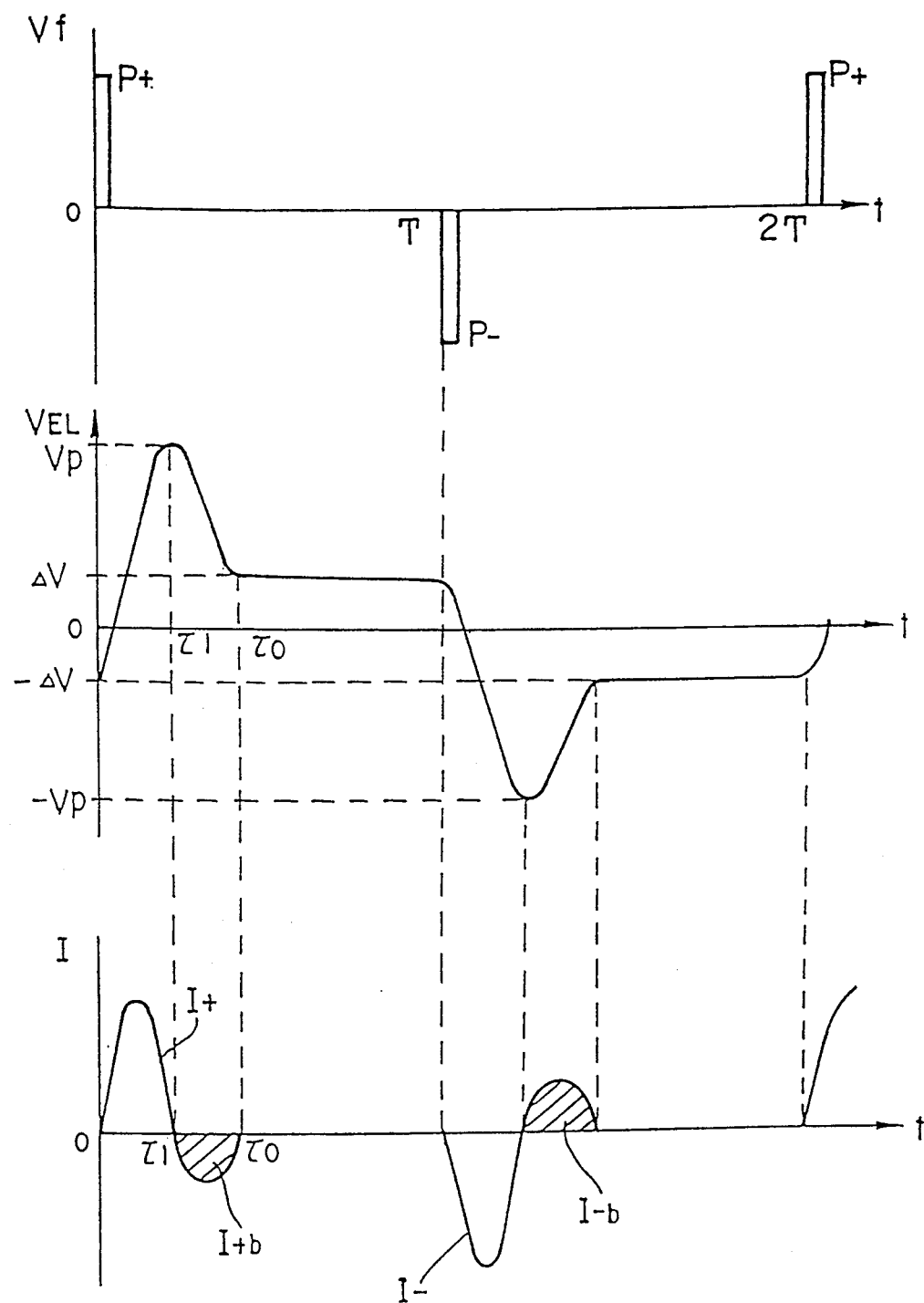
FIG. 8 graphically illustrates the trigger pulses applied to zero-crossing switches T1, T2 and how the voltage $V_{EL}$ and current I of EL in the LCR series circuit vary with time.

The aforementioned operating mode is shown in FIG. 8 in correspondence with the circuit shown in FIG. 1. In FIG. 8, Vf represents the voltage waveform of trigger pulses. When a trigger puls P+ is applied to the gate of a triac T1, T1 on the plus side channel is opened (ON) to allow current I+ to flow until the EL is charged to a peak voltage Vp, at which point current I+ becomes zero and T1 is closed (OFF). Then, reverse current I+ is fed back to the plus side of the power source through the reverse bypass diode D1.

As a result, a power (charge) corresponding to a hatched area of reverse voltage I+b shown in FIG. 8 is recovered as surplus power. In this case, D1 acts to achieve auto-locking at point $\tau_0$ when feedback is complete, terminating the dynamism on the plus side.

As charge is recovered from EL as reverse current, the potential of EL drops from Vp and reaches $V_{EL} = \Delta V$ at $t = \tau_0$, but drops no more. This means that provided that EL has a capacity C, energy corresponding to $C\Delta V^2/2$ is lost as an unrecovered energy on every half cycle due to charge recombination.

Therefore, lower values of $\Delta V$ provide more efficient recovery. Although $\Delta V$ cannot be reduced to zero, of course, energy corresponding to $C(V_p^2 - \Delta V^2)/2$ is recovered as reverse current on every half cycle.

Upon receipt of a trigger inverse pulse P− after T second, triac T2 on the minus side channel is opened (ON) and similar dynamics follow as shown in FIG. 8.

Here the dynamics of current and voltage are independent of time duration T except the condition $\tau_0 \leq T$, and the operating frequency f of EL is f = 1/2T.

Therefore, the operating frequency f of EL panel may be adjusted to any desired value within the range:

$\tau_0 \leq T$, that is, $f \leq 1/2\tau_0 = 1/4\tau_1$, and the luminance of lighted EL may be variably adjusted to any desired value within this range.

It is to be noted that an EL light emitting power supply circuit including an inverter having a pair of complementary power MOSFET's as the pair of positive and negative switches also achieves feedback of reverse current and auto-locking for inhibiting recharging, resulting in dynamism as in the present invention.

In order to obtain the same dynamism as the present invention, the following conditions must be met:

$$\tau_1 \leq \lambda \leq \tau_0$$

$$\tau_0 \leq T$$

wherein $\lambda$ is the pulse duration of a pulse signal applied to one switch.

As understood from a comparison with the requirement: $\tau_0 \leq T$ according to the present invention, the additional requirement: $\tau_1 \leq \lambda \leq \tau_0$ is imposed on the inverter using FET switches. Differently stated, the present invention imposes no substantial limit on the pulse duration $\lambda$ of a pulse signal applied to the switch, and consequently, the luminance of lighted EL is more readily adjustable.

Understandably, the independence of the dynamism of the EL light emitting power supply circuit from the time duration T according to the present invention means that for a narrow span of T, the waveforms of current flows I+ and I− become simply close to each other while the waveforms of current flows I+ and I− themselves remain unchanged. As to the waveform of voltage $V_{EL}$, only the peak-to-peak spacing is reduced while the values of Vp, $\Delta V$, $\tau_1$ and $\tau_0$ remain unchanged.

Next, the second aspect of the present invention is described.

The second aspect is the same in principle as the first aspect in that reverse current is accomplished and that auto-locking of its dynamism is achieved by a combination of a zero-crossing switch and a reverse bypass diode in a reverse bypass channel.

The second aspect, however, takes into account the situation that the DC power source voltage of $\pm E$ volt or 2E volt is further stepped up or down or variably stepped up or down to apply AC load across the EL panel.

Figure 3:
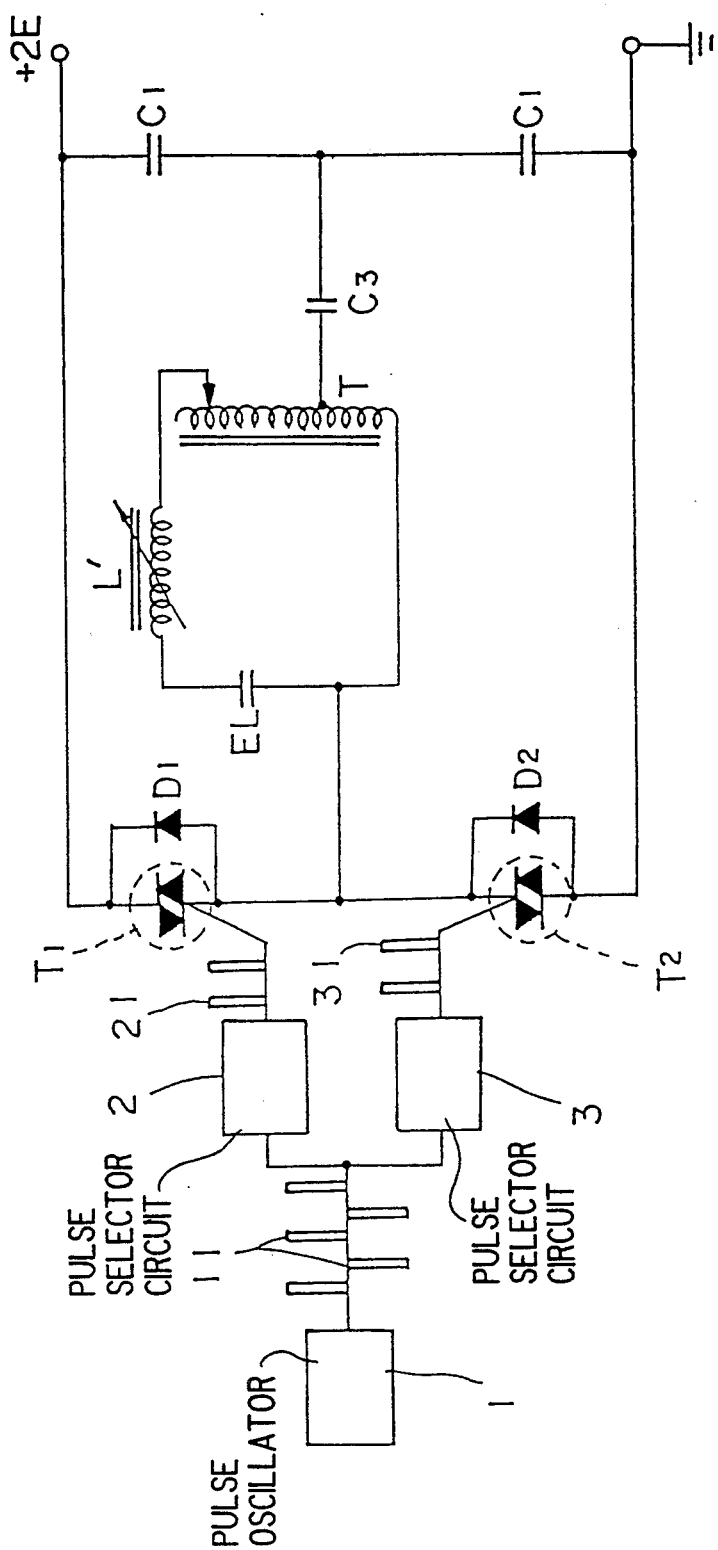
FIG. 3 is a diagram showing a further embodiment of the light emitting power supply circuit according to the present invention.

FIG. 3 shows an exemplary EL light emitting power supply circuit according to the second aspect.

This circuit is obtained by modifying the first aspect such that a transformer T is substituted for the inductor L and a bipolar capacitor C3 is provided in place of EL to form a primary side circuit whereby the AC power available on the secondary side of transformer T is used to operate EL.

The embodiment is shown in FIG. 3 as having not only EL, but also a compensating inductor L' in series with the EL connected between output terminals of the transformer T on its secondary side.

In this embodiment, the capacitance of the bipolar capacitor C3 and the coupled inductance of the transformer T having the EL panel and compensating inductor L' coupled on the secondary side become a series LC component as calculated on the primary side.

Therefore, the dynamics of this circuit are described in connection with the LCR circuits shown in FIGS. 4 and 6 by considering the inductance of L as the coupled inductance of the transformer T and the capacitance of C as the capacitance of the bipolar capacitor C3.

It is to be noted that although the transformer T has a variable winding ratio so that a variable voltage is applicable across EL and the compensating inductor L' has a variable inductance in the embodiment of FIG. 3, a transformer T having a fixed winding ratio and a compensating inductor L' having a fixed inductance are satisfactory or even L' is eliminatable where the luminance of lighted EL is regulated in terms of frequency.

When the power source has a voltage as low as 12 volts and a step-up DC-DC converter is unapplicable or even applicable, but the power consumption within the DC-DC converter forms a non-negligible part of the power consumption of the entire system, the second aspect is an effective measure for increasing the voltage without resorting to a DC-DC converter.

The signals for turning ON (or opening) the zero-crossing switches T1, T2 in the EL light emitting power supply circuit according to the present invention may be optical signals and other conventionally used signals as well as the previously mentioned trigger voltage pulses. Description is made using the trigger voltage as typical signals.

As shown in FIG. 1, a pulse oscillator 1 produces pulse oscillation waves 11 alternately at a frequency f and a period of 2T which are separated into plus and minus pules by pulse selector circuits.

A plus pulse selector circuit 2 selects only plus pulses for applying plus pulses 21 at an interval of 2T to the gate of T1. A minus pulse selector circuit 3 selects only minus pulses and inverts them for applying minus inverted pulses 31 to the gate of T2 at an interval of 2T with a phase offset by T from the plus pulses.

Understandably, f and T can be adjusted in accordance with the desired lighting luminance and to meet the requirement: $f \leq 1/2\tau_0$.

In the practice of the present invention, no limit is imposed on the DC power source used.

Figure 9:
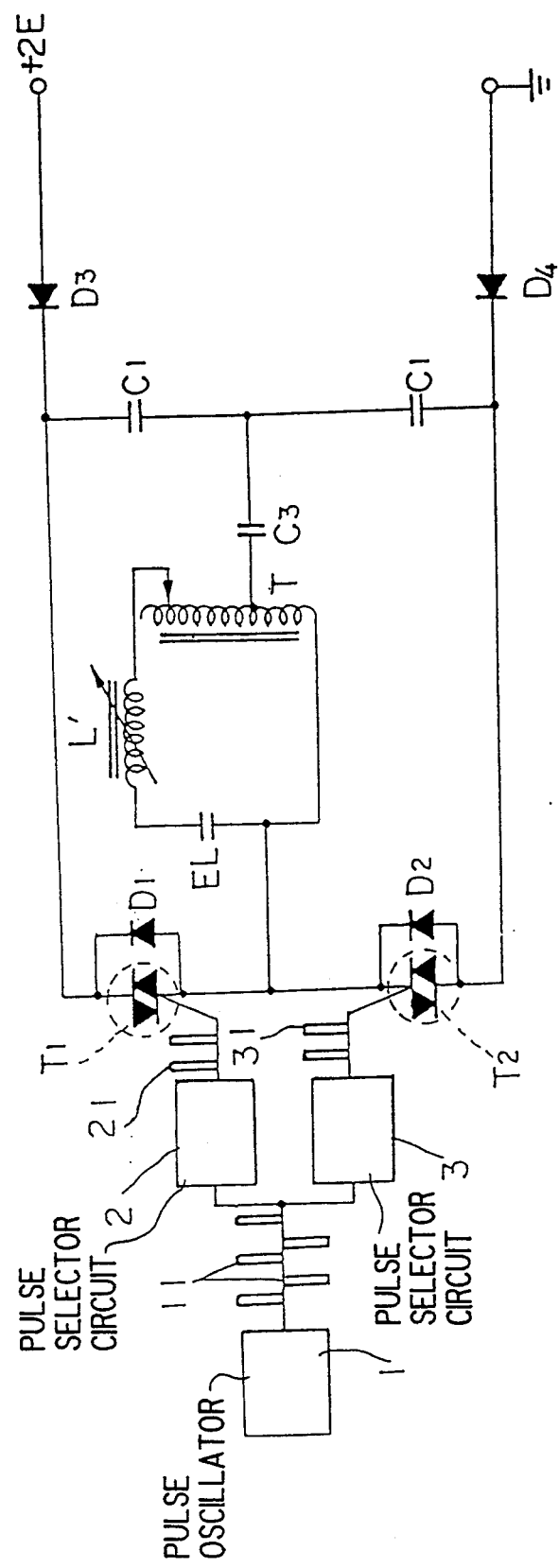
FIG. 9 is a diagram showing a further embodiment of the light emitting power supply circuit according to the present invention.

The present invention is effective from a power saving aspect particularly when the power source used is a secondary battery power source or solar battery power source. However, direct charging of the secondary battery with the reverse current causes the battery to be reduced in life and is sometimes difficult due to the battery's property. Therefore, in the event of a battery serving as the power source, it is preferable to insert diodes D3, D4 between the power source and the zero-crossing switches T1, T2 and to provide capacitors C1, C1 as reverse power buffers in the second aspect, for example, as shown in FIG. 9.

Next, description is made of a preferred embodiment of an EL light emitting power supply circuit in which a pair of zero-crossing switches T1, T2 are constituted by photo-thyristor couplers or zero-crossing circuits comprising photo-thyristor couplers.

Figure 10:
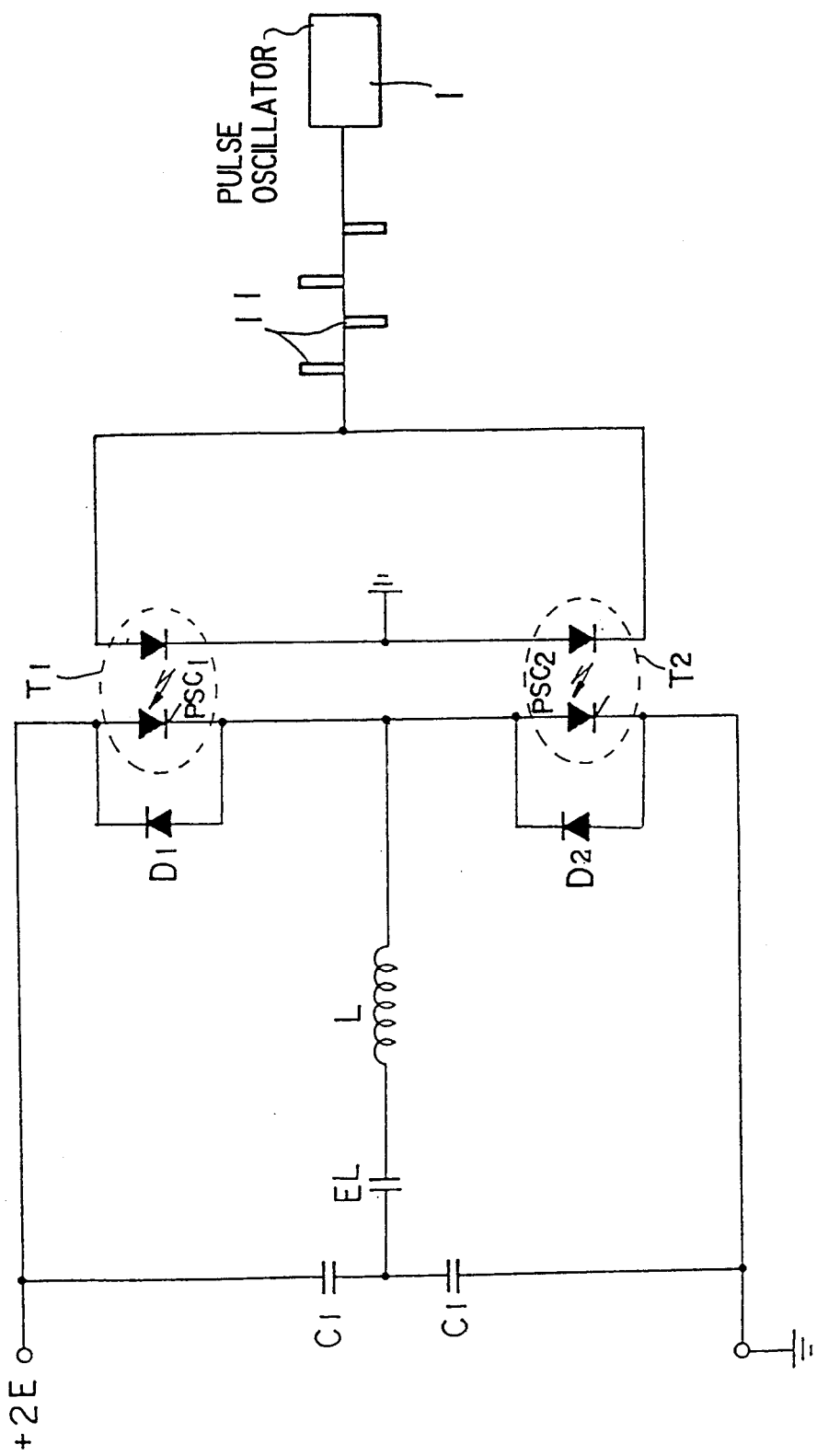
FIG. 10 is a diagram showing a further embodiment of the light emitting power supply circuit according to the present invention.

FIG. 10 shows an EL light emitting power supply circuit in which the zero-crossing switches T1, T2 in the circuit of FIG. 2 are constituted by photo-thyristor couplers PSC1, PSC2.

In such a circuit, a circuit (trigger circuit) on the side of a pulse oscillator 1 can be electrically isolated from a circuit (power circuit) on the side of EL so that the oscillator 1 and related components may be effectively protected.

In this embodiment, pulse selector circuits 2, 3 may be eliminated as shown in FIG. 10.

Figure 11:
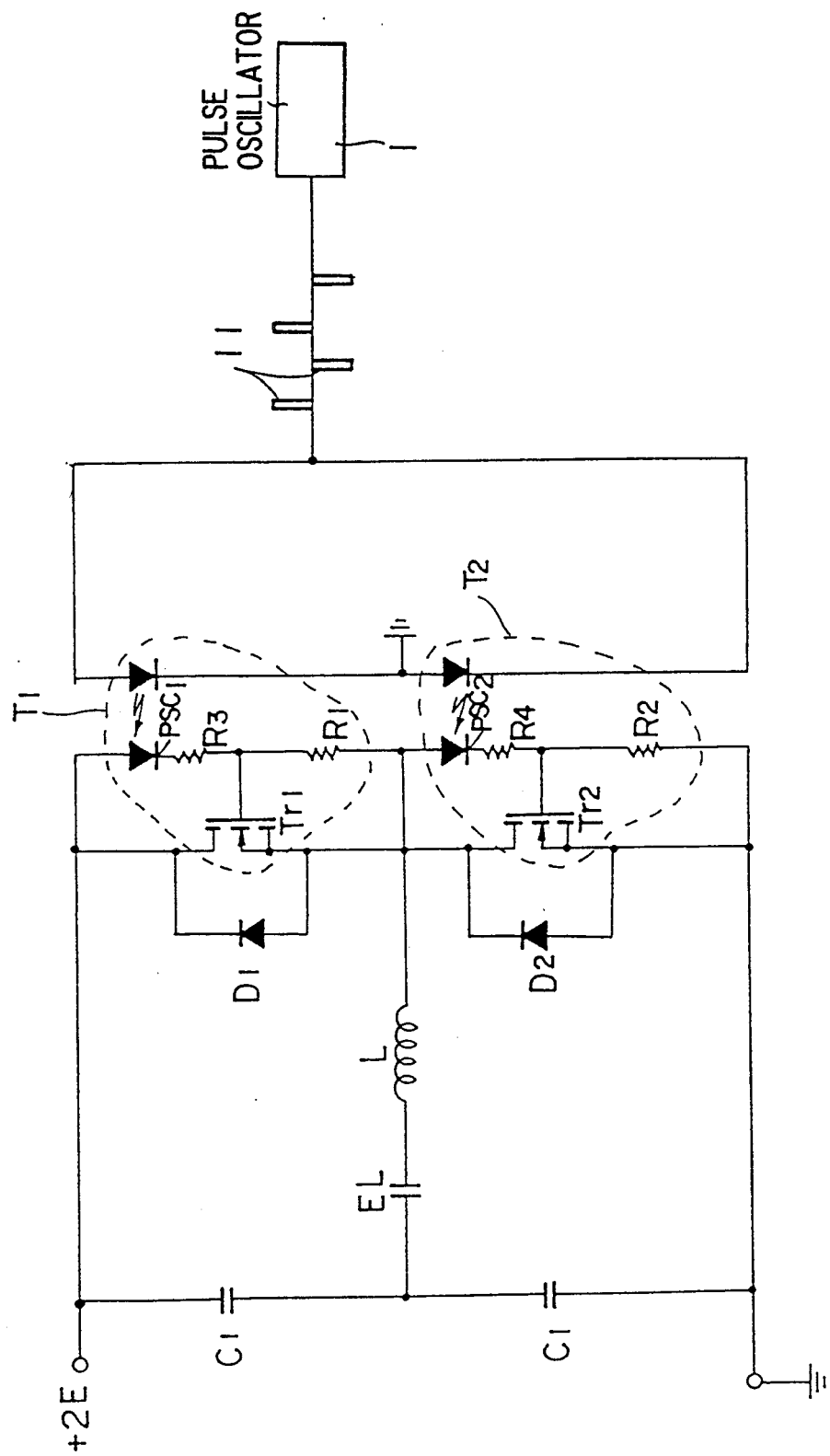
FIG. 11 is a diagram showing a further embodiment of the light emitting power supply circuit according to the present invention.

FIG. 11 shows another EL light emitting power supply circuit in which the zero-crossing switch T1 is constituted by a zero-crossing circuit comprising a photo-thyristor coupler PSC1, resistance elements R1, R3 and a switch Tr1, and similarly, the zero-crossing switch T2 is constituted by a zero-crossing circuit comprising a photo-thyristor coupler PSC2, resistance elements R2, R4 and a switch Tr2.

Various transistors such as MOSFET's and other FET's and power transistors may be used as the switches Tr1 and Tr2. Connection is made such that the photo-thyristor couplers PSC1, PSC2 controlledly open and close the switches Tr1, Tr2, respectively.

In this circuit, a pulse from pulse oscillator 1 is applied to photo-thyristor coupler PSC1 to make PSC1 conductive, allowing current to flow across resistance elements R3, R2. Then voltage is applied to the gate of switch Tr1 to make Tr1 conductive, allowing high current to flow between the drain and the source.

Although the current across PSC1 is very weak, PSC1 is maintained conductive insofar as the current value is above the holding current value of the photo-thyristor. The current flow across PSC1 is synchronous with the current flow between the drain and the source of Tr1, and becomes zero at the same time when the source-drain current flow becomes zero. Then PSC1 and Tr1 are closed and the reverse current is recovered to the plus side of the power source through diode D1.

Upon subsequent receipt of an inverted pulse, photo-thyristor coupler PSC2 becomes conductive and the same as above is repeated on the opposite side channel.

The MOSFET or other transistors used as switches Tr1, Tr2 have a lower resistance than the photo-thyristor couplers. As mentioned above, this circuit is designed to operate EL by conducting high current between the drain and the source of switches Tr1, Tr2, thereby achieving a substantial reduction of the power loss across zero-crossing switches T1, T2 as compared with the circuit shown in FIG. 11.

Such a zero-crossing circuit may be obtained by coupling a bipolar capacitor in parallel with R1, R2 because the circuit is only required to achieve the above-mentioned dynamism.

Additionally, in the EL light emitting power supply circuit shown in FIG. 11, zero-crossing circuits or a pair of zero-crossing switches T1, T2 may be constructed by using zero-crossing switch elements, for example, various thyristors such as reverse-blocking triode thyristors (SCR) and bidirectional triode thyristors (triac) instead of photo-thyristor couplers PSC1, PSC2. This arrangement also achieves a substantial reduction of the power loss across zero-crossing switches T1, T2 as compared with a circuit in which a pair of zero-crossing switches T1, T2 are directly formed by only zero-crossing switch elements as shown in FIG. 2.

Figure 12:
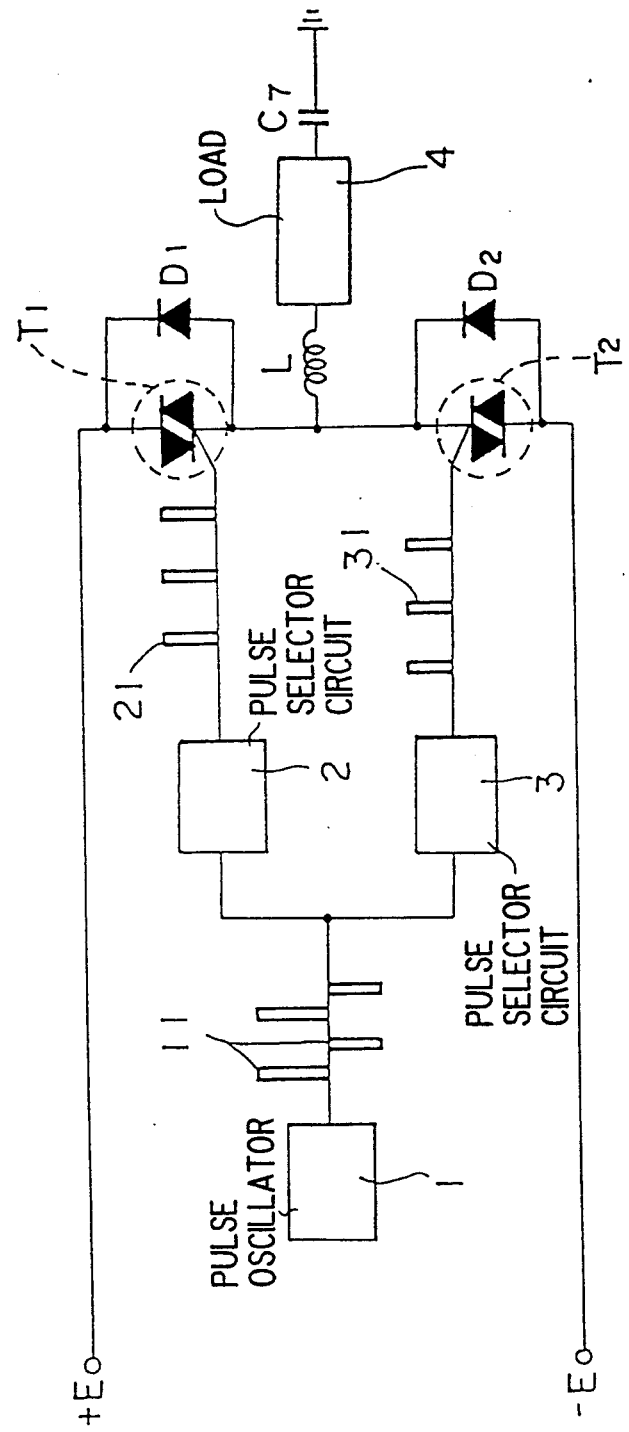
FIG. 12 is a diagram showing a further embodiment of the light emitting power supply circuit according to the present invention.
Figure 13:
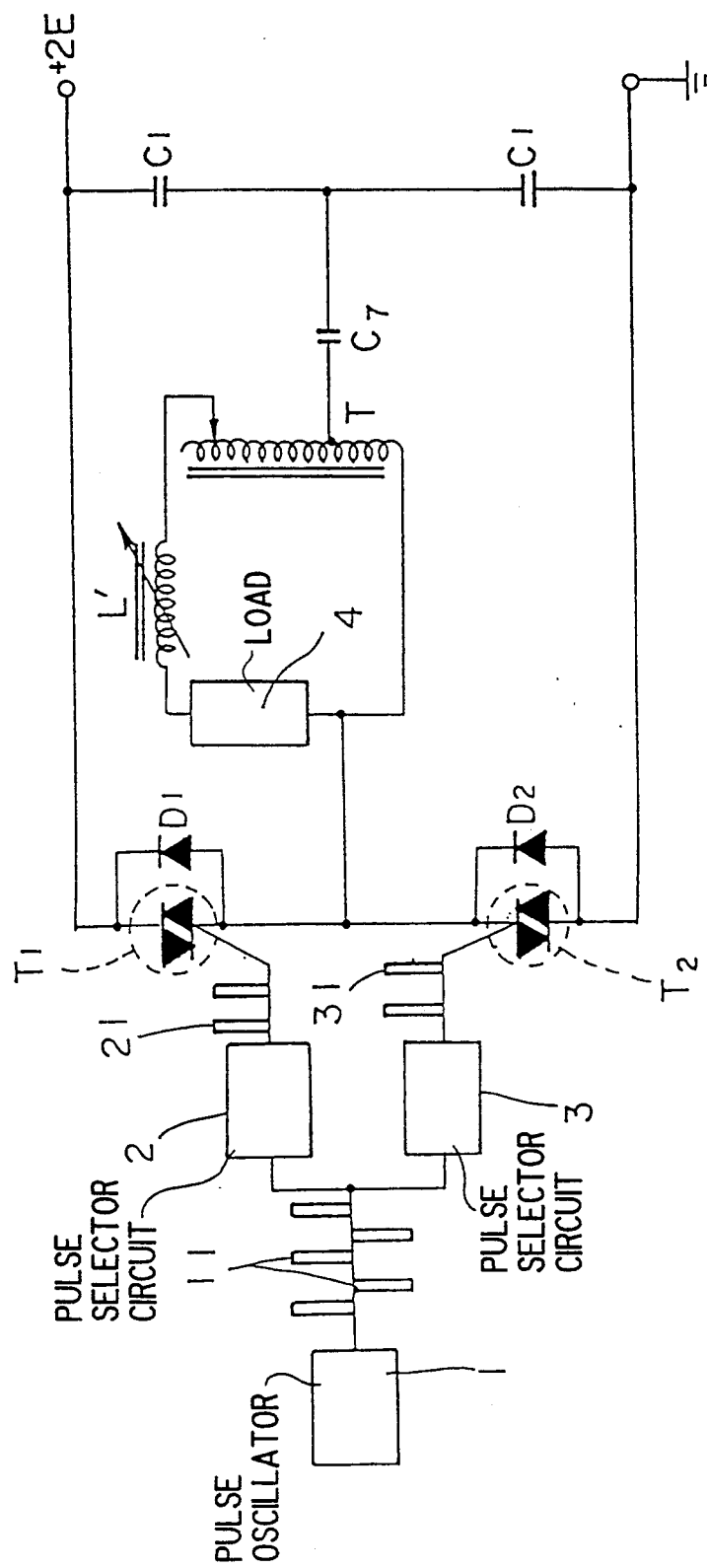
FIG. 13 is a diagram showing a further embodiment of the light emitting power supply circuit according to the present invention.

Next, FIGS. 12 and 13 illustrate preferred embodiments of the light emitting power supply circuit of the present invention in which the light emitting section comprises a load having resistance and/or diode characteristic.

The light emitting power supply circuit shown in FIG. 12 is the same as the foregoing EL light emitting circuit except that an inductor L, a bipolar capacitor C7, and a load 4 are series connected to form a load circuit. Also, the light emitting power supply circuit using a transformer T shown in FIG. 13 is the same as the foregoing EL light emitting circuit except that the EL is replaced by a load 4. In this way, the foregoing light emitting circuits which have been described as having EL can be applied to loads having resistance and/or diode characteristic simply by replacing a part thereof.

In the event of a light emitting power supply circuit comprising a light emitting section including a load having capacitive load characteristic and a load having resistance and/or diode characteristic, the load 4 in FIGS. 12 and 13 is replaced by a light emitting section having a combination of predetermined loads. The bipolar capacitor C7 may be eliminated from a light emitting circuit corresponding to FIG. 12 since the circuit has a capacitive component of EL.

Figure 14:
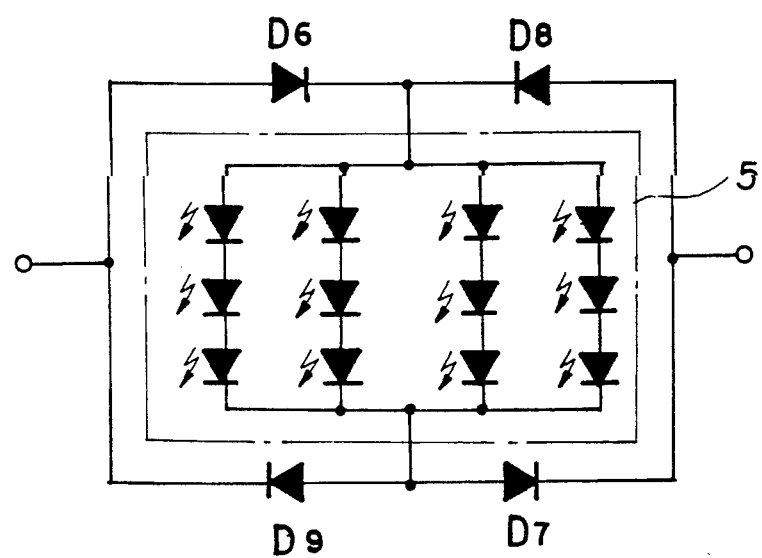
FIG. 14 is a diagram showing one exemplary circuit for supplying current to an array of loads having diode characteristic in one direction.

Additionally, when loads having diode characteristic, for example, LED and LD are used, diodes D6, D7, D8, D9 are preferably connected to form a circuit as shown in FIG. 14 such that both charging current and reverse current may flow across the loads having diode characteristic, for example, an array 5 in one direction.

Next, a further embodiment of the present invention using first and second inverters is described by referring to an example wherein the light emitting section comprises an EL panel which is a preferred load having capacitive load characteristic.

Figure 15:
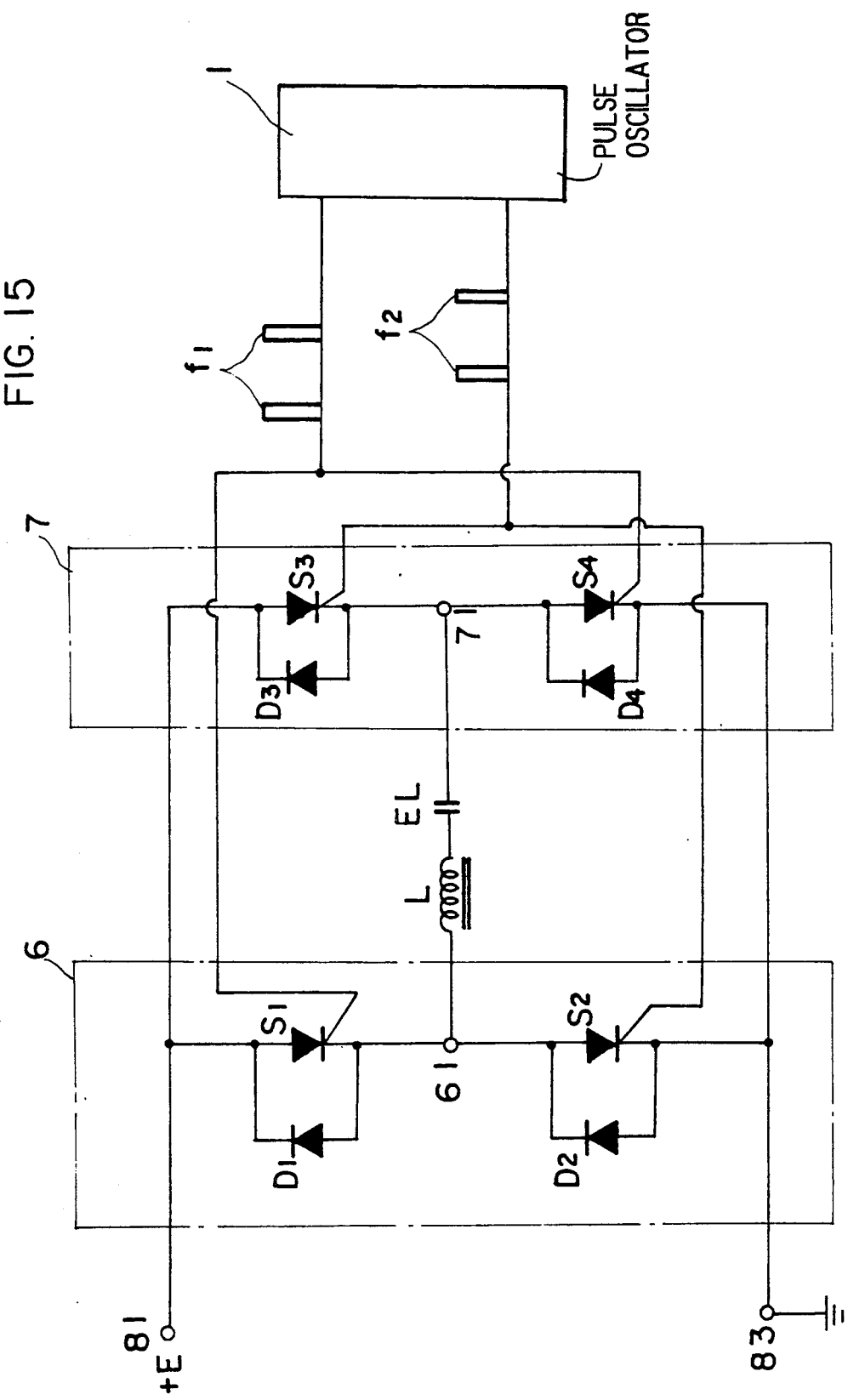
FIG. 15 is a diagram showing a further embodiment of the light emitting power supply circuit according to the present invention.

FIG. 15 shows a light emitting power supply circuit in which an LC circuit (exactly LCR circuit) having an EL panel EL and an inductor L series connected thereto is a load circuit.

This load circuit may be one containing an EL panel EL and an inductor L in at least a part of a series coupled component, and a bipolar capacitor may be connected in parallel to the EL for the purpose of adjusting the capacitance (C value) of the circuit at a predetermined value.

The load circuit which is an LC or LCR circuit is coupled at one end to a coupling output terminal 61 of a first inverter 6 and at the other end to a coupling output terminal 71 of a second inverter 7.

The first and second inverters 6 and 7 are connected across a DC power source. The DC power source used herein may be of the single or dual mode although the inverters are connected across a DC power source of the single mode in the illustrated embodiment.

A DC power source of the single mode can be modified into a DC power source of the dual mode by using a pair of bipolar capacitors having substantially equal capacitance to divide the power source voltage. In this case, the pair of bipolar capacitors serve as reverse current buffers.

As previously described, the light emitting power supply circuit using an EL panel according to the invention is push-pull driven at a frequency f. In general, f ranges from about 50 Hz to about 600 Hz, EL has a capacitance of about 0.1 $\mu$F to about 10 $\mu$F, and L is about 30 mH to about 10 H.

The light emitting power supply circuit of the invention utilizes the transient current vibration phenomenon of an LC or LCR series circuit. The phenomenon is described in conjunction with FIGS. 16, 17, 18 and 19.

Figure 16:
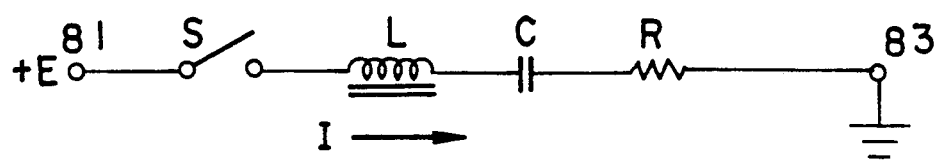
FIG. 16 is a diagram showing an LCR series circuit.
Figure 17:
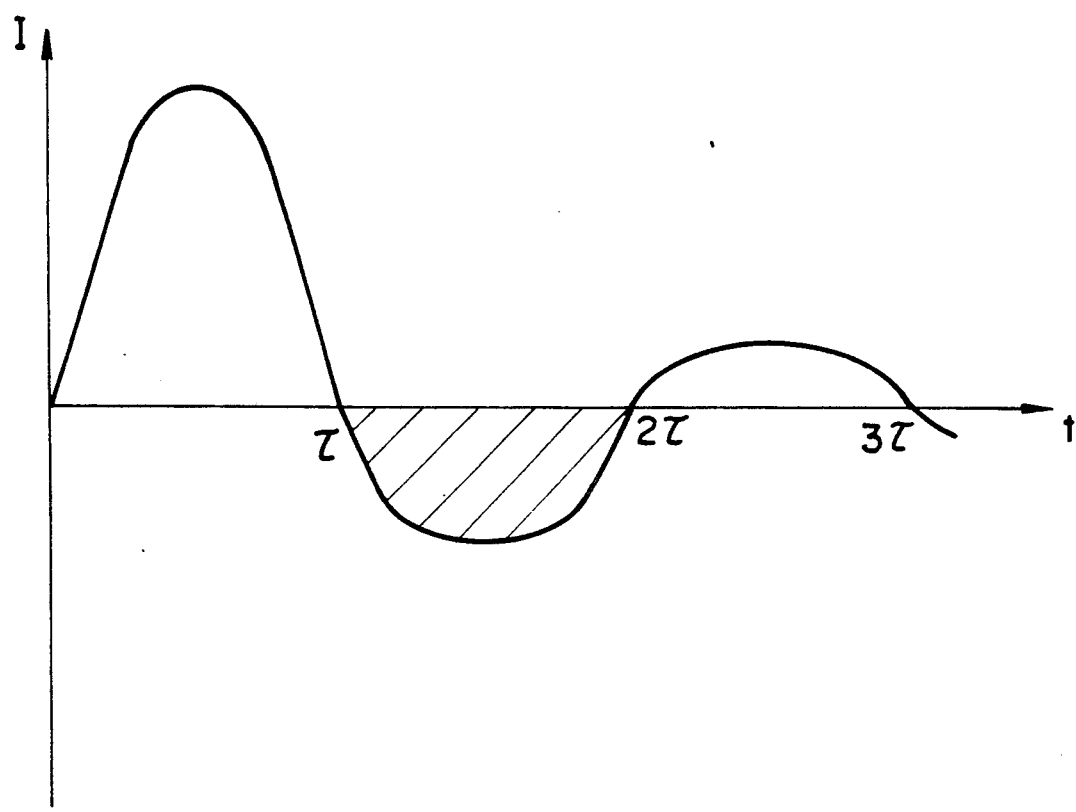
FIG. 17 graphically illustrates how the load current I varies with time.

In an LCR series circuit, with a terminal 81 having a DC voltage applied thereto and a terminal 83 grounded as shown in FIG. 16, conduction of a switch S allows a load current I to flow, showing attenuating vibration having a time constant $\tau$ as shown in FIG. 17.

Figure 18:
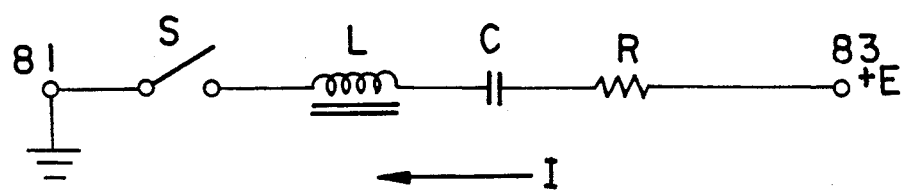
FIG. 18 is a diagram showing an LCR series circuit.
Figure 19:
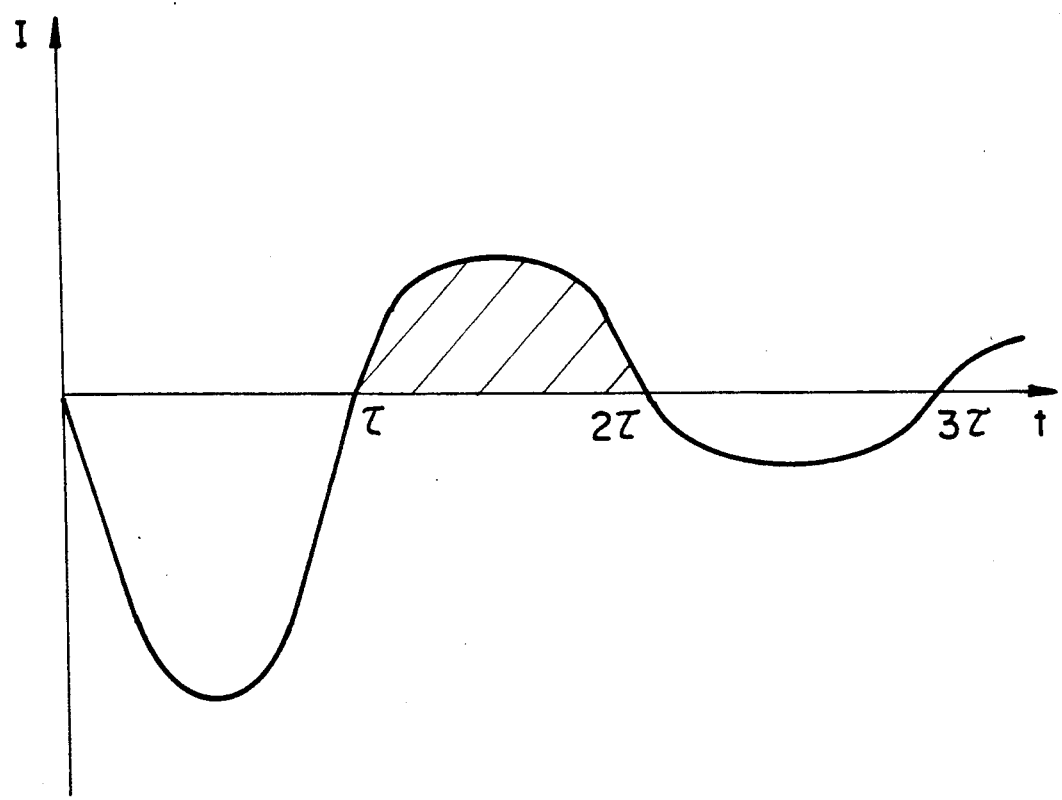
FIG. 19 graphically illustrates how the load current I varies with time.

Then, with a DC voltage of +E applied to the terminal 83 as shown in FIG. 18, conduction of switch S allows a current I to flow, showing inverted attenuating vibration having a time constant $\tau$ as shown in FIG. 19.

The proportion of attenuation and time constant $\tau$ are determined by the values of L, C and R, which should, in turn, meet the above-mentioned vibration conditions.

Figure 20:
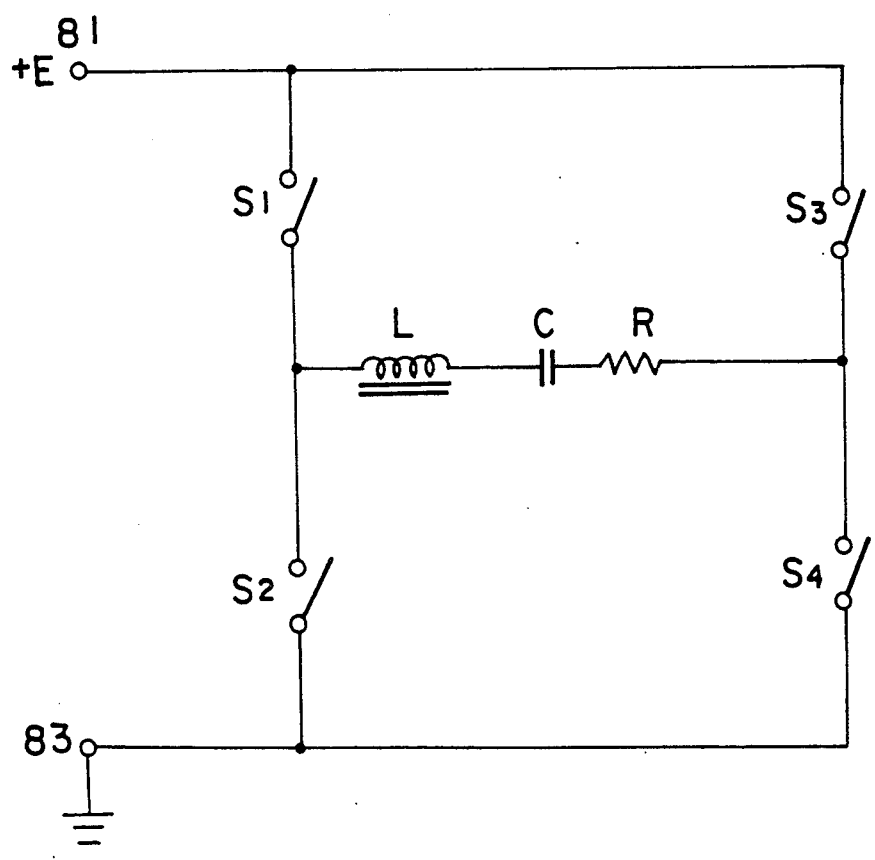
FIG. 20 is a circuit diagram for explaining the operation of the light emitting power supply circuit according to the present invention.

The principle of the light emitting power supply circuit using first and second inverters and the operating system according to the invention is the same as that achieved by alternately changing over the switches S of FIGS. 16 and 17 for conduction. More particularly, consideration is made to the circuit shown in FIG. 20 in which L is the inductance of an inductor L, C is the capacitance of EL, and R is a resistance equivalent component of the light emitting power supply circuit.

Switches are adjusted to have a conduction time $2\tau$ and an idle time $\Delta\tau$, and a pair of coupled switches S1 and S4 and a pair of coupled switches S2 and S3 are alternately and repeatedly turned on and off in synchronization.

Figure 21:
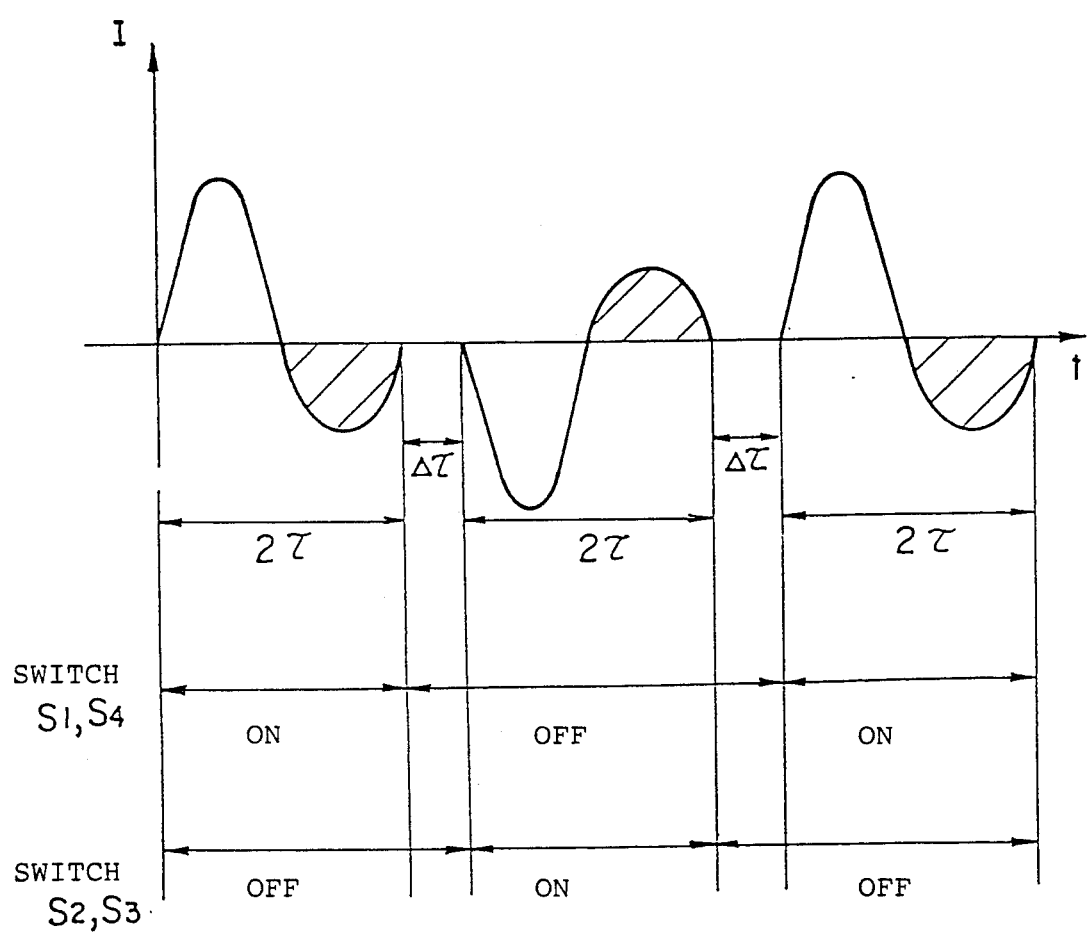
FIG. 21 graphically illustrates how the load current I varies with time.

By using such an operating system, a current mode as shown in FIG. 21 is established wherein a current flow corresponding to a hatched area is recovered at each cycle to the supply power source side, achieving the benefit of energy saving. The period in this example is equal to $4\tau + 2\Delta\tau$. The circuit can operate the EL element with one-half voltage of that required for the aforementioned operating circuit having a single inverter circuit and a DC power source of the dual mode having $\pm E$ volt.

For example, operation of an EL element requires to apply alternating current of high voltage (having a peak-to-peak value of $\pm 100$ to $\pm 150$ V). With a single inverter circuit, the power source should have at least a voltage of about $\pm 50$ to $\pm 75$ V. If the primary power source is a single DC power source of 12 V, a DC-DC converter must be constructed in order to effectively derive a DC voltage of the dual mode of $\pm 50$ to $\pm 75$ V from the single DC power source of 12 V, but such construction is difficult.

In contrast, the operating system using first and second inverters according to the present invention can use a single DC power source of the single mode of 50 to 75 V, which is quite beneficial in the construction of a DC-DC converter and power efficacy.

As previously described, the light emitting power supply circuit of the present invention includes the first inverter 6 having a pair of switches S1, S2 adapted to alternately open and close their channels and the second inverter 7 having a pair of switches S3, S4 adapted to alternately open and close their channels in inverse synchronization with the pair of switches S1, S2 of the first inverter 6.

The first and second inverters 6 and 7 are connected such that at least a set of switches performing opening and closing operations in inverse relationship among the switches S1 to S4 may automatically close their channels through the zero-crossing mechanism when the current value becomes substantially zero.

The set of switches performing opening and closing operations in inverse relationship may be any one of the four sets of S1 and S2, S1 and S3, S2 and S4, and S3 and S4.

Also acceptable is an arrangement in which any three switches or all the switches automatically close their channels through the zero-crossing mechanism.

The zero-crossing mechanism may comprises a zero-crossing switch element and/or a zero-crossing circuit as previously described.

In the circuit of FIG. 15, a pair of positive and negative switches S1, S2 of the first inverter 6 and a pair of positive and negative switches S3, S4 of the second inverter 6 are formed by zero-crossing switch elements.

The first and second inverters 6 and 7 have bypass channels formed by reverse current bypass diodes D1, D2, D3, D4 which bypass the positive and negative switches S1, S2, S3, S4, respectively, and are connected to a DC input power source of $+E$ volt.

As long as the inverters used herein have the above-mentioned construction, no special limitation is imposed on the remaining construction which may be a well-known one.

The zero-crossing elements used as the positive and negative switches S1, S2, S3, S4 may be thyristors, photo-thyristors, or photo-couplers having a withstand voltage of at least 2E volt, for example, reverse-blocking triode thyristors (SCR), bidirectional triode thyristors (triac), or photo-thyristor couplers although SCR's are used in the illustrated embodiment.

The use of photocouplers such as photo-thyristor couplers as the zero-crossing mechanisms permits an oscillator section (trigger circuit) to be electrically isolated from a circuit (power circuit) on the EL side, thereby effectively protecting the oscillator section.

With this construction, switches S1 and S4 in a coupling pair and switches S2 and S3 in a coupling pair are alternately turned on with trigger pulses f1 and f2.

Once a thyristor is turned on, it keeps open until the current value becomes zero, at which time it is turned off and thereafter keeps closed until it receives a subsequent trigger pulse.

Therefore, charging current to EL flows through the thyristor and the reverse current flows through the reverse current bypass diode for feeding back and recovery.

Figure 22:
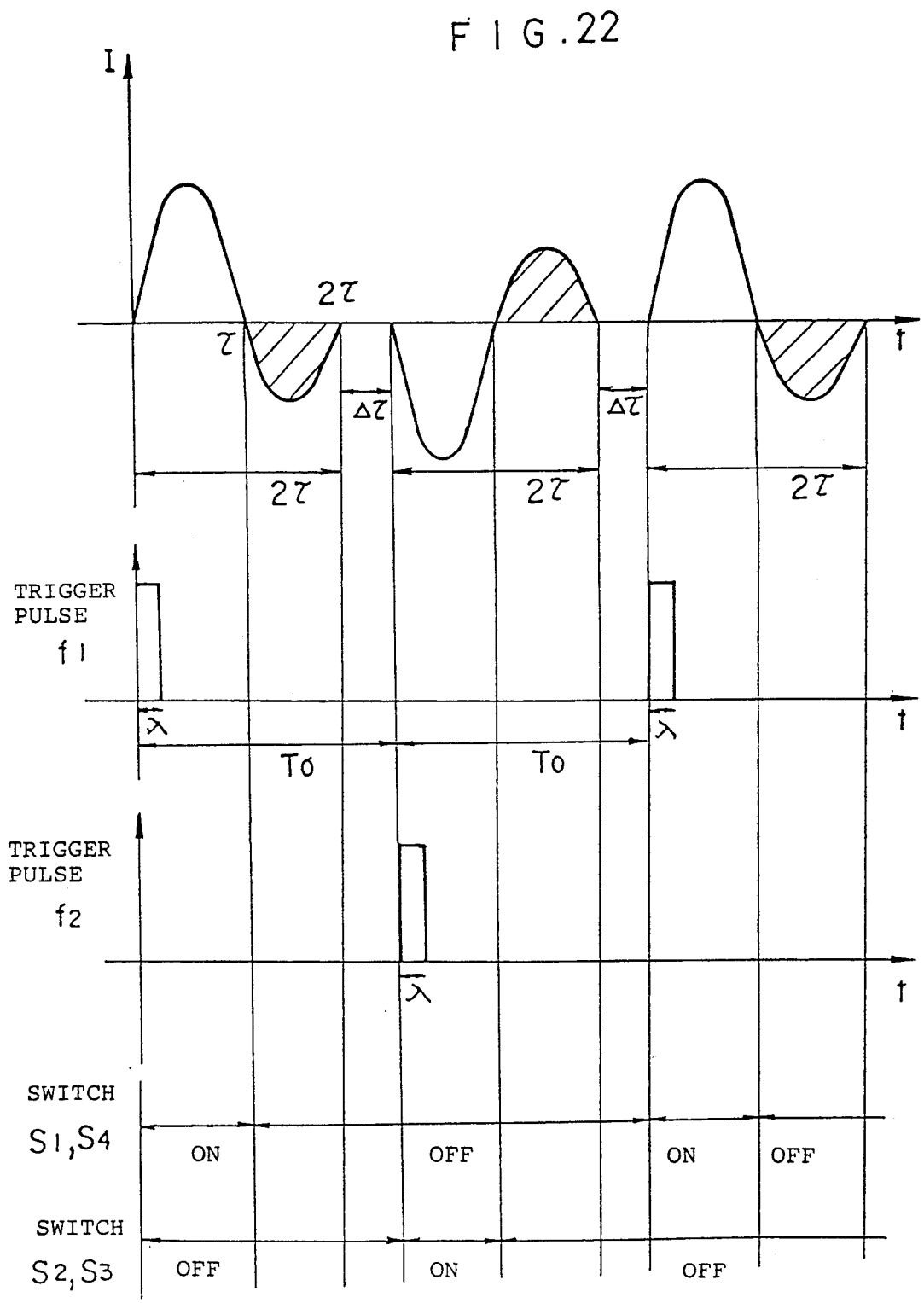
FIG. 22 graphically illustrates how the load current I varies with time when trigger pulses f1 and f2 are applied to alternately open and close switches S1, S4 and S2, S3.

The dynamism of such load current I is shown in FIG. 22.

Trigger pulses f1, f2 for turning on the thyristors have a pulse duration $\lambda$ which may be a permissible minimum time span necessary to turn on the thyristors.

This accommodates for a change in the capacitance of EL, for example, a change of time constant $\tau$ as occurring when an EL element of different surface area is operated or when the EL lowers its capacitance, such that the dynamism of recovering reverse current may automatically follow.

The EL operating frequency f is $f = 1/2T_0$ wherein $T_0$ is a time span between trigger pulses f1 and f2. The use of the light emitting power supply circuit of the present invention allows a load factor to be adjusted to a desired value by regulating or adjusting frequency f. This is readily understood from the waveform of current I in FIG. 8 because a higher frequency f results in a reduced width of $\Delta\tau$ and a lower frequency f results in an extended width of $\Delta\tau$, but the waveform of current I through the load circuit for every half cycle (half period $T_0$) remains unchanged.

Therefore, the load operating system of the present invention allows the frequency f to vary up to the upper limit of operating frequency $f = 1/4\tau$ insofar as the waveforms of current I for every half cycle (half period $T_0$) do not overlap.

Then, if the oscillator 1 for driving the inverter has a variable frequency f, the lighting luminance can be readily adjusted or set within the range of $2\tau \leq T_0$. In this way, the provision of a zero-crossing mechanism eliminates substantial limitation on the pulse duration of trigger pulses to be applied to the switches as previously mentioned, resulting in effective accommodation of time constant t of a wider range and easier adjustment of the lighting luminance of EL.

If zero-crossing switch elements are not used for all the switches S1 to S4, the remaining switch(es) may be comprised of a field effect transistor or another transistor whose channel is opened and closed in synchronization with the zero-crossing switch element(s). In this case, since the switch turn-on time is from $\tau$ to $T_0$, a wide change of time constant $\tau$ can be accommodated by setting or adjusting the turn-on time in the vicinity of $T_0$.

Since the elements constituting a pair of positive and negative switches S1, S2 or S3, S4 of each inverter as such need not have the nature of a zero-crossing switch as previously described in conjunction with the operating circuit using a single inverter, the zero-crossing switch mechanism may comprise a zero-crossing circuit in which a pair of positive and negative switches of the inverter is comprised of field effect transistors (FET) or other transistors, for example, which are controlled by means of a thyristor or photo-coupler such that the switches are turned off when the circuit current becomes zero (that is, $t=\tau$ or $t=2\tau$).

As compared with the case where load current is directly passed across the zero-crossing switch element, such a construction using a zero-crossing circuit achieves a reduction of the resistance equivalent component of the switch and a further reduction of power loss. Particularly when the switch is controlled by a photo-coupler, the oscillator circuit can be electrically isolated from the load circuit so that the oscillator circuit is effectively protected.

Figure 23:
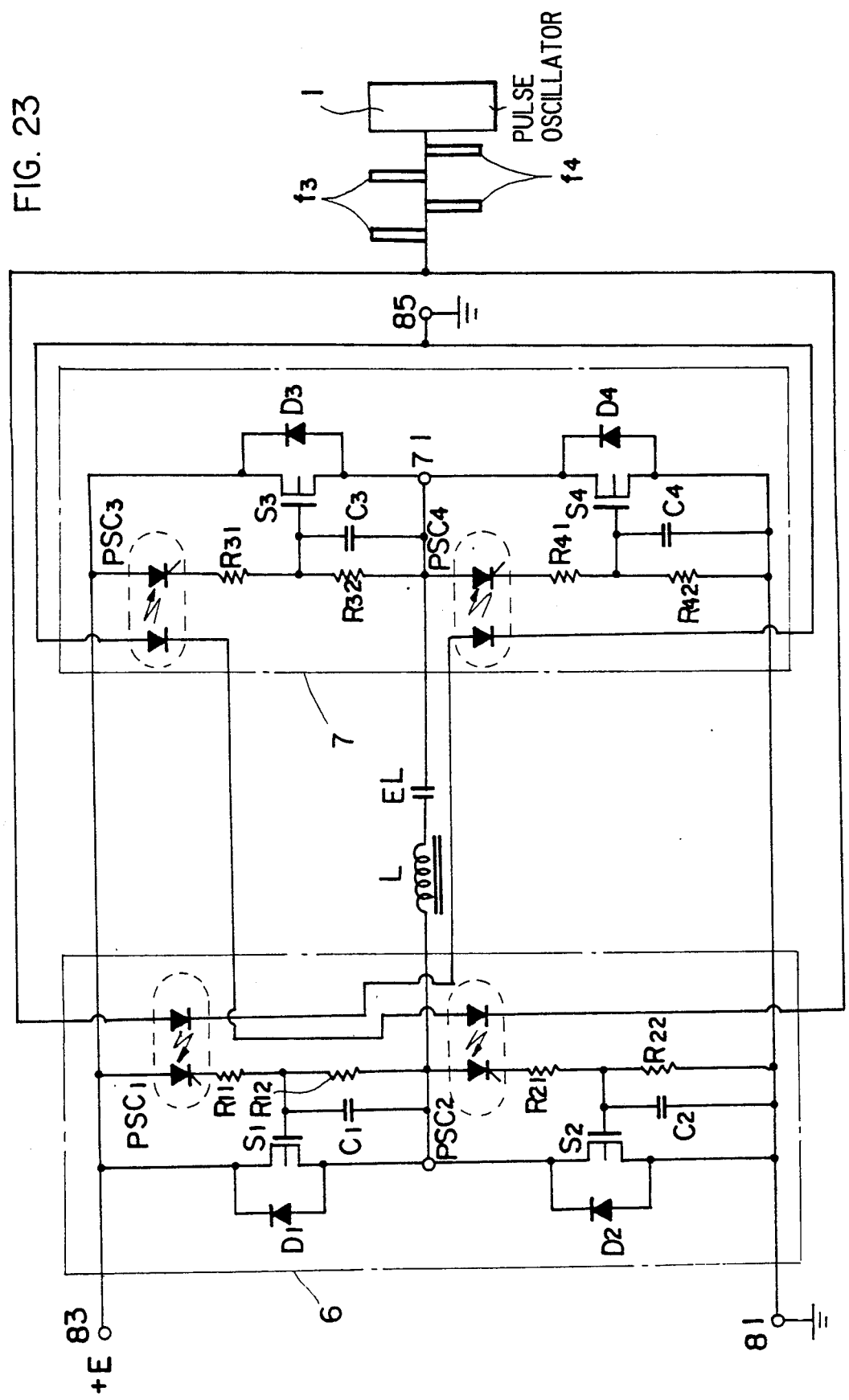
FIG. 23 is a diagram showing a further embodiment of the light emitting power supply circuit according to the present invention.

FIG. 23 illustrates one preferred embodiment using such a zero-crossing circuit.

The EL operating circuit of FIG. 23 includes switches S1, S2, S3, S4 formed of FET's of the same channel and photo-thyristor couplers PSC1, PSC2, PSC3, PSC4 coupled to the gate of the FET's wherein the switches and photo-thyristor couplers are turned off at $t=\tau$.

These switches S1, S2, S3, S4 constitute a main circuit for load current with reverse current bypass diodes D1, D2, D3, D4, an inductor L, and EL.

The photo-thyristor couplers PSC1, PSC2, PSC3, PSC4, resistors R11, R12, R21, R22, R31, R32, R41, R42, bipolar capacitors C1, C2, C3, C4, inductor L, and EL constitute an ancillary or driving circuit for controlling the switches for opening and closing, part of the load current flowing through the ancillary circuit.

The resistors R11, R12, R21, R22, R31, R32, R41, R42 in the ancillary circuit serve to limit the current flow through the ancillary circuit and to divide the potential across the ancillary circuit for delivering a gate voltage to the switches S1, S2, S3, S4. The bipolar capacitors C1, C2, C3, C4 serve to help drive the switches S1, S2, S3, S4 stably and may be commonly used ones.

Terminals 81, 85 are ground terminals of the load circuit and driving oscillator circuit which may be separate or common. Rather, the advantage of this circuit is that even when the terminals 81, 85 are common, the photo-thyristor coupler can electrically isolate the oscillator circuit from the load circuit, thereby protecting the oscillator section.

The EL operating circuit shown in FIG. 23 is operated by first actuating oscillator 1, applying a first pulse f3 at a point of time $t=0$ to conduct photo-thyristor couplers PSC1 and PSC4. Then current flows through the ancillary circuit to open switches S1, S4 (conductive), allowing load current to flow through the load circuit including EL. Since the current flow through the ancillary circuit has a waveform which synchronously follows the waveform of the current through the load circuit, current flows through the ancillary circuit as the holding current of the thyristor for $0<t<\tau$, keeping switches S1, S4 conductive.

Then, at a point of time $t=\tau$, the load current becomes zero for an instant, and the current through the ancillary circuit accordingly becomes zero for an instant. As a result, PSC1 and PSC4 are closed due to the zero-crossing switching of the thyristor, and switches S1, S4 are closed and kept off until receipt of a subsequent pulse f3. In this case, reverse current is fed back through reverse bypass diodes D4, D1, and these diodes D4, D1 and the zero-crossing mechanism prevent EL from re-charging.

On subsequent application of a second pulse (inverted pulse) f4, photo-thyristor couplers PSC2 and PSC3 conduct and switches S2, S3 become conductive, repeating the same operation as mentioned above.

As the operation is repeated, the current I through the load circuit shows a dynamic characteristic as graphically shown in FIG. 22.

Figure 24:
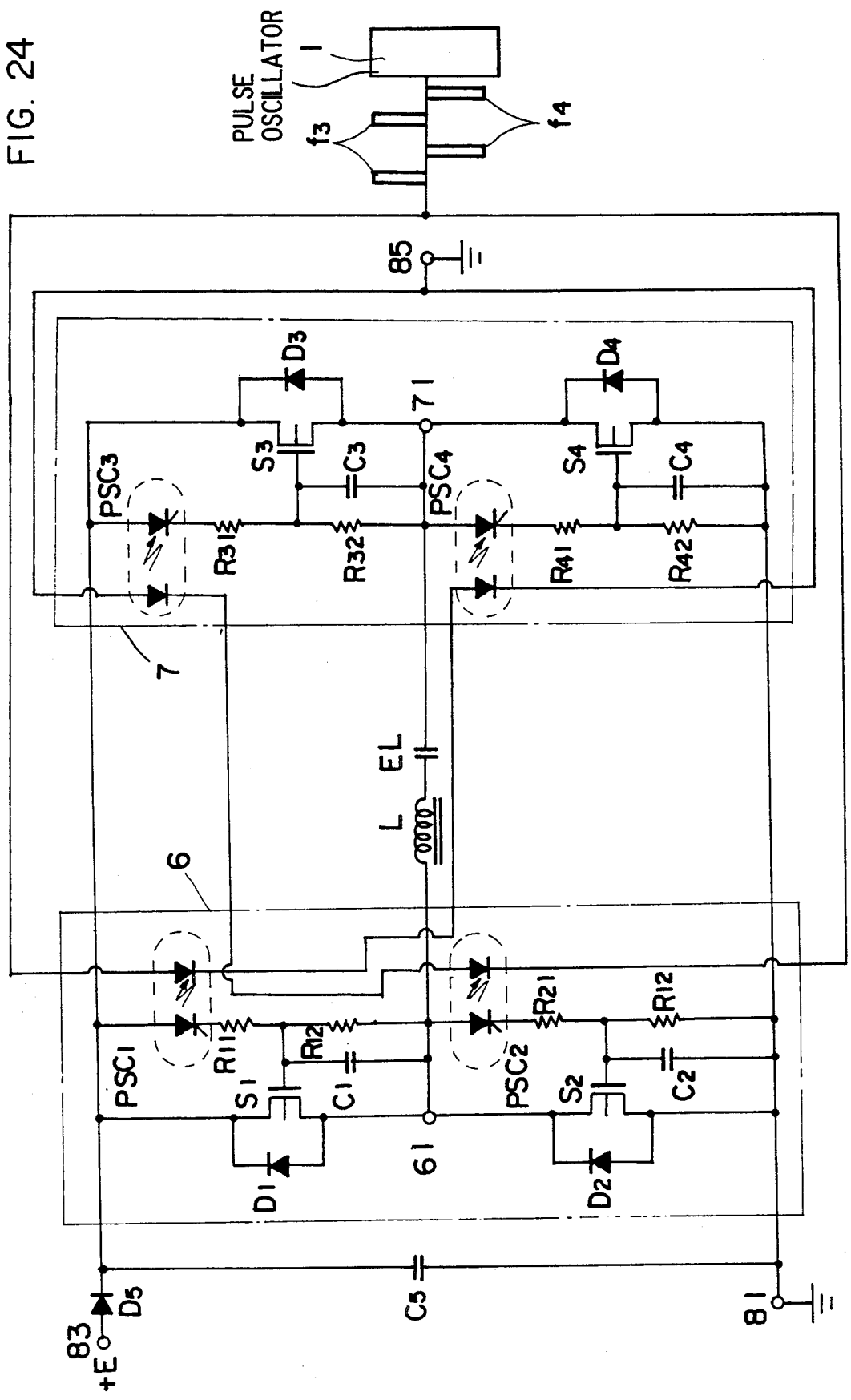
FIG. 24 is a diagram showing a further embodiment of the light emitting power supply circuit according to the present invention.

One of the important features of the light emitting power supply circuit of the present invention is to recover electric power to the supply power source side as reverse current. However, if it is undesirable to return the current directly to the power source, like the operating circuit using a single inverter, a buffer capacitor C5 is provided on the power source side as shown in FIG. 24 so that capacitor C5 is charged and discharged. If it is desirable to protect the power source, a reverse-blocking diode D5 may be provided.

Figure 25:
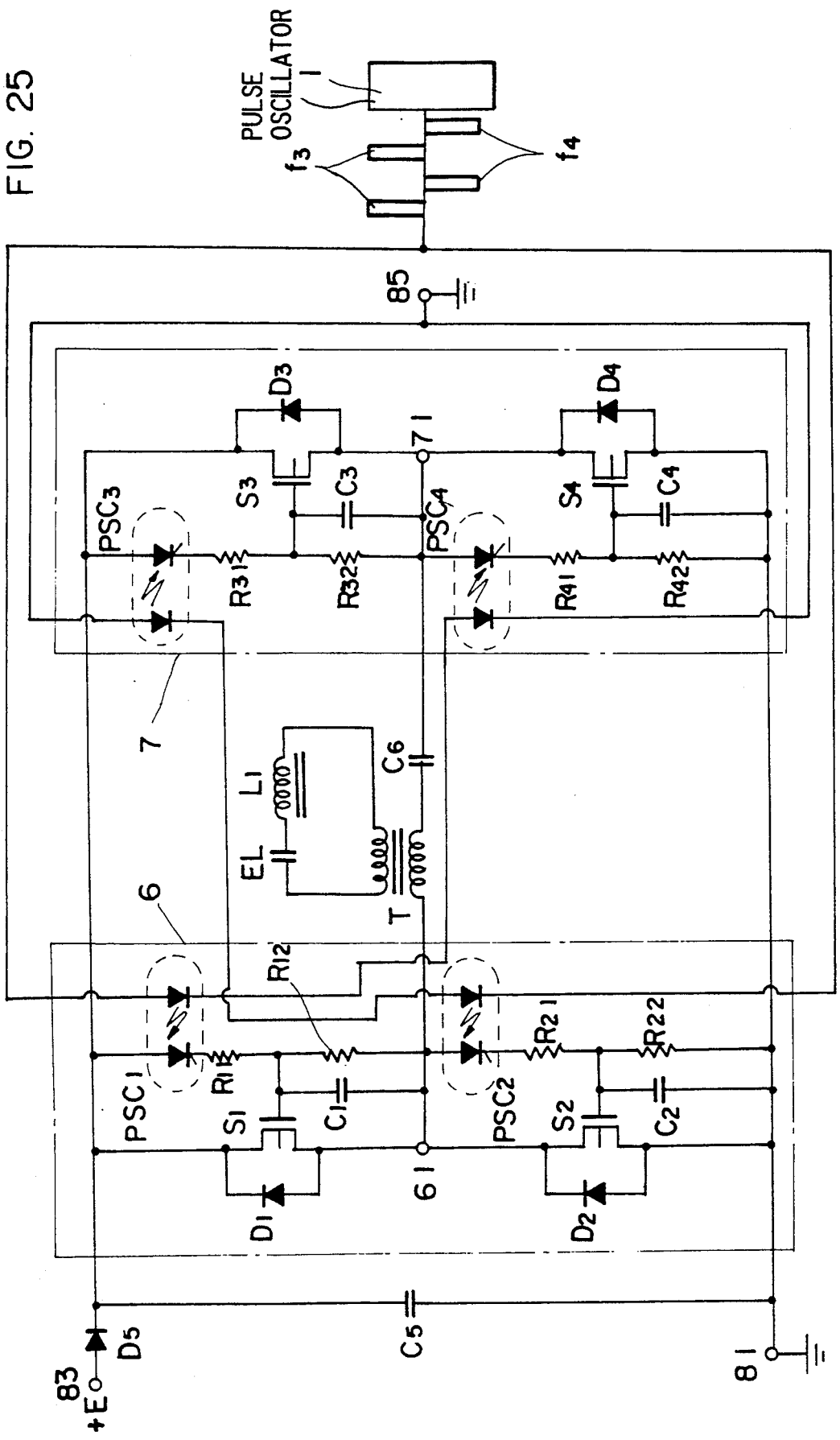
FIG. 25 is a diagram showing a further embodiment of the light emitting power supply circuit according to the present invention.

Next, a preferred embodiment of using a transformer T as the inductor L is described in conjunction with FIG. 25.

This circuit is a modification of the foregoing embodiment wherein the inductor L is replaced by a transformer T and a bipolar capacitor C6 is provided in place of EL to form a primary side circuit whereby AC power available on the secondary side of the transformer T is used to operate EL.

The embodiment is shown in FIG. 11 as having not only EL, but also a compensating inductor L' in series with the EL connected between output terminals of the transformer T on its secondary side.

In this embodiment, the capacitance of the bipolar capacitor C6 and the coupled inductance of the transformer T having the EL panel and compensating inductor L' coupled on the secondary side become a series LC component as calculated on the primary side.

Therefore, the dynamics of this circuit are described in connection with the foregoing circuit by considering the inductance of inductor L as the coupled inductance of the transformer T and the capacitance of EL as the capacitance of the bipolar capacitor C6.

This circuit allows high AC voltage to be applied to the load EL.

Figure 26:
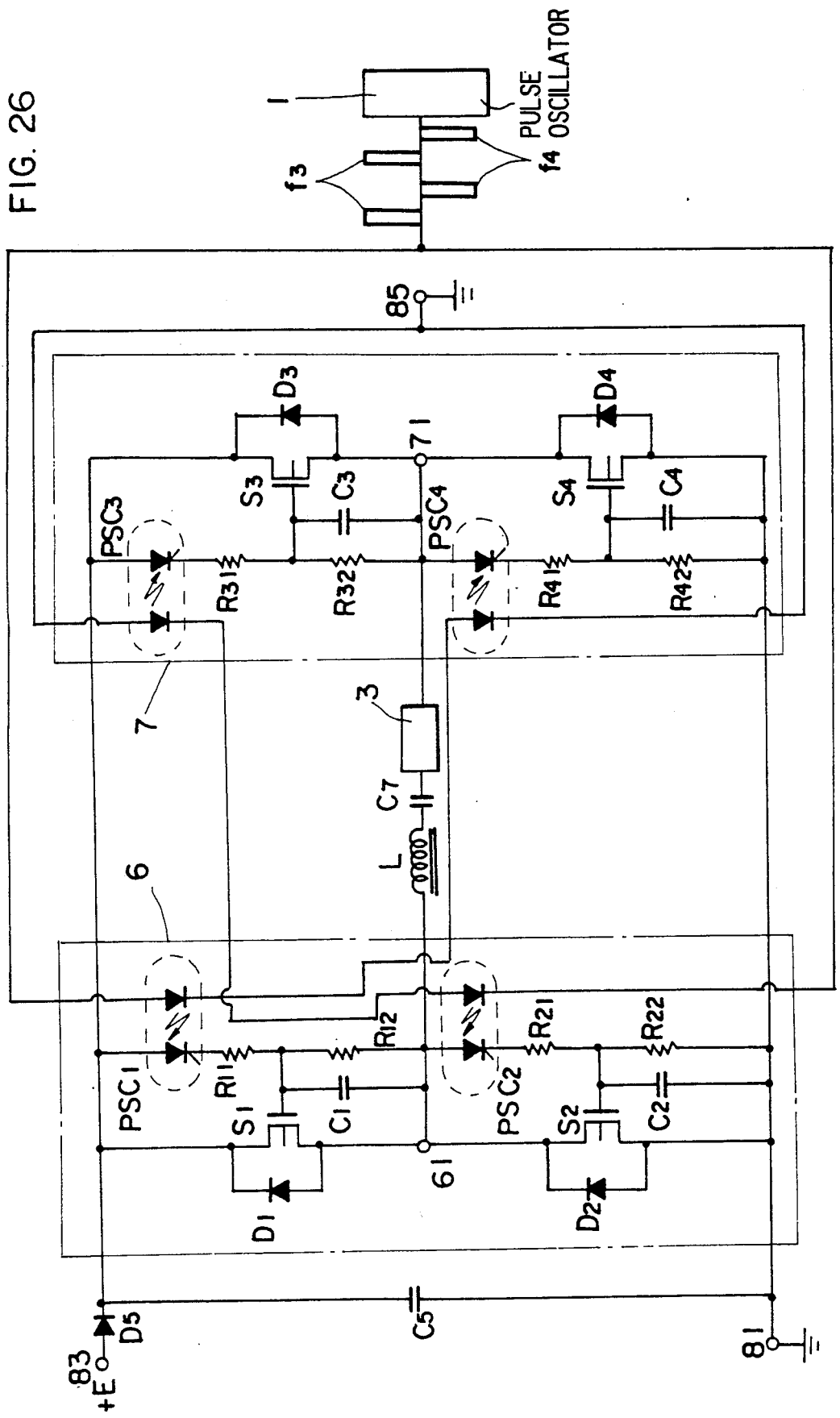
FIG. 26 is a diagram showing a further embodiment of the light emitting power supply circuit according to the present invention.
Figure 27:
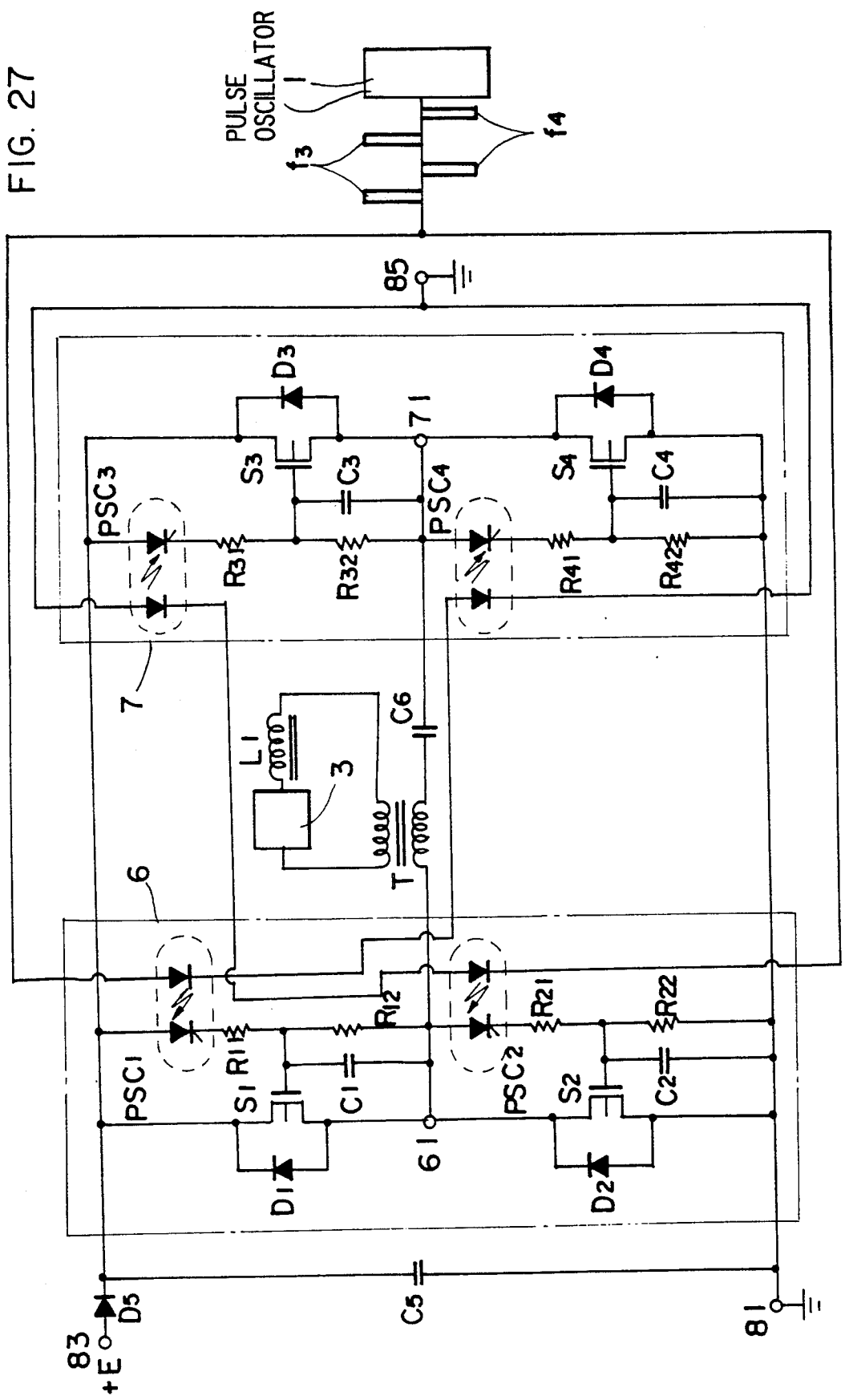
FIG. 27 is a diagram showing a further embodiment of the light emitting power supply circuit according to the present invention.

Next, FIGS. 26 and 27 illustrate preferred embodiments of the light emitting power supply circuit of the present invention in which the light emitting section comprises a load having resistance and/or diode characteristic.

The light emitting power supply circuit shown in FIG. 26 is the same as the foregoing EL operating circuit except that an inductor L, a bipolar capacitor C7, and a load 3 are series connected to form a load circuit.

Also, the light emitting power supply circuit using a transformer T shown in FIG. 27 is the same as the foregoing EL operating circuit except that the EL is replaced by a load 3.

In the event of a load operating power supply circuit comprising a light emitting section including a load having capacitive load characteristic and a load having resistance and/or diode characteristic, the load 3 in FIGS. 26 and 27 is replaced by a light emitting section having a combination of predetermined loads. The bipolar capacitor C7 may be eliminated from an operating circuit corresponding to FIG. 26 since the circuit has a capacitive component of EL.

Understandably, in the light emitting power supply circuit using a single inverter and the light emitting power supply circuit using first and second inverters, the load circuit is provided with coupling terminals adapted for removably coupling to the light emitting section or load whereby the light emitting section or load can be removably coupled at the coupling terminals.

Only several embodiments of the present invention have been described, and all circuits equivalent in electrical circuitry to the construction defined herein are included within the scope of the present invention.

BENEFITS OF THE INVENTION

The present invention achieves a significant improvement in EL operating efficacy since the surplus power accumulated in EL and the like is recovered to the supply power source side as reverse current before the channel on the opposite electrode side is opened (ON).

No or little current flows through the circuit at the instant when the inverter performs switching operation, eliminating a switching energy loss.

Therefore, energy efficiency is further increased in a synergistic manner, and heat release on switching is eliminated with increased safety. Elimination of heat release eliminates a need for heat dissipation means, allowing for size reduction in that an EL element having a relatively large surface area can be operated by operating means of compact size.

The EL light emitting power supply circuit of the present invention can operate a blue-green color EL panel having a surface area of about 4,000 $cm^2$ to 1 $m^2$ using an inverter having a volume of about 3 cm×4 cm×8 cm while the lighting luminance can be adjusted to a desired value within the range of about 5 $cd/m^2$ to 50 $cd/m^2$ by varying the inverter's frequency.

Since an EL element having a varying surface area or a variety of loads can be operated at any desired level of lighting luminance with the same inverter, the operating system is substantially improved in mass production amenability and yield.

Where two inverters are cooperatively driven to operate the load, the power source voltage may be one half of that required in the conventional design. This results in effective utilization of the power source voltage and is very advantageous in the manufacture of a converter for providing a DC power source.

To demonstrate the benefits of the present invention, the inventors have made a series of experiments. Some are illustrated below.

EXPERIMENT

An EL operating device comprising the fundamental circuit shown in FIG. 2 was fabricated.

The input power source to the EL operating device was a DC power source having a voltage of 12 volts, which was increased to 140 volts by means of a step-up DC-DC converter of the single mode, which was used as an input power source to the inverter. Therefore, E=70 volts in FIG. 2.

The lighting frequency was variable in accordance with the EL surface area and other factors by volume adjustment.

The inductor L was a shielded pot core of ferrite having a coil wound thereon. It had an inductance of 29.5 mH and a DC resistance of about 4 Ω.

These parts are assembled to fabricate the EL operating device which was housed in a casing of about 35 mm×60 mm×80 mm without heat dissipating means like heat sinks.

The EL panels used were of the following two types.
EL panel A: dimensions 720 mm×550 mm luminous area 3766.0 $cm^2$
EL panel B: dimensions 550 mm×550 mm luminous area 2851.4 $cm^2$ The EL panels were of green lighting type available from Fukubi Chemical K.K. and had a sheet resistivity of about 80 Ω.

A lighting experiment was done on four sets of A+A (two panels A in parallel), B+B (two panels B in parallel), A, and B. The input power (W) to the EL operating device for the panel(s) to be luminous at a surface illuminance of 10 lx is reported in Table 1 together with operating efficacy (Lm/W) and frequency.

TABLE 1

| Set | Operating illuminance (1×) | Input power (W) | Operating efficacy (Lm/W) | Operating frequency (Hz) |
|---|---|---|---|---|
| A + A | 10 | 2.0 | 3.77 | 190 |
| B + B | 10 | 1.6 | 3.56 | 160 |
| A | 10 | 1.19 | 3.16 | 170 |
| B | 10 | 0.975 | 2.96 | 165 |

As is evident from the experimental results, the EL light emitting power supply circuit of the present invention achieves EL operation at an efficacy of about 3 to 4 lumen/watt, which is improved by a factor of 3 or 4 over the conventional techniques.

The operating device of a relatively compact size, that is, casing outer dimensions of about 35 mm×60 mm×80 mm can be used to operate all the EL panel sets of different surface areas to an equal illuminance. Such a versatile EL operating device has never been found in the art.

Heat release was little as evidenced by the fact that the luminous surface temperature relative to the ambient atmosphere marked an increase of less than 1 degree after 8 hours of operation.

Next, another series of experiments was done using an EL operating device having the circuit arrangement shown in FIG. 1.

The EL panels were of green lighting type available from Fukubi Chemical K.K. and identified below as A1, A2, B1, B2, C, D1, D1, D2, E, F and G. For each type, a plurality of panels having different sheet resistivity were prepared.
EL panel A1: luminous area 3766.0 $cm^2$
EL panel A2: luminous area 3766.0 $cm^2$ El panel B1: luminous area 2851.4 cm$^2$
EL panel B2: luminous area 2851.4 cm$^2$
EL panel C: luminous area 1367.4 cm$^2$
EL panel D1: luminous area 2044.4 cm$^2$
EL panel D2: luminous area 2044.4 cm$^2$
EL panel E: luminous area 1094.4 cm$^2$
EL panel F: luminous area 678.4 cm$^2$
EL panel G: luminous area 528.0 cm$^2$ The inductor L had an inductance of 30 mH, and the inverter was connected across an input power source of ±50 volts which had been increased by a DC-DC converter of the dual mode.

Table 2 shows the adjusted operating frequency for operating sets of A1+A1, B1+B1, A2, D1+E, B2, D2, C, F, and G at the same illuminance of 10 lx.

Also reported in Table 2 is the R equivalent component in the circuit including the EL panel's sheet resistivity.

TABLE 2

| Set | Luminous area (cm$^2$) | Operating frequency (Hz) at R equivalent component of | | | | | | |
|---|---|---|---|---|---|---|---|---|
| | | 40Ω | 50Ω | 60Ω | 70Ω | 80Ω | 90Ω | 100Ω |
| G | 528.0 | 80 | 83 | 87 | 91 | 96 | 101 | 106 |
| F | 678.4 | 82 | 86 | 91 | 96 | 102 | 108 | 114 |
| C | 1367.4 | 90 | 96 | 105 | 113 | 123 | 134 | 147 |
| D2 | 2044.4 | 96 | 106 | 117 | 129 | 144 | 161 | 182 |
| B2 | 2851.4 | 103 | 116 | 131 | 148 | 170 | 197 | 230 |
| D1 + E | 3138.8 | 105 | 119 | 135 | 155 | 180 | 211 | 250 |
| A2 | 3766.0 | 110 | 126 | 146 | 171 | 203 | 244 | |
| B1 + B1 | 5702.8 | 125 | 150 | 182 | 226 | | | |
| A1 + A1 | 7532.0 | 139 | 173 | 221 | | | | |

As is evident from Table 2, the system of the present invention allows a single EL operating power supply circuit, that is, a single EL operating device to operate various sets of EL panels having different surface area or different sheet resistivity including from (A1+A1) to G at a desired level of illuminance simply by regulating the frequency.

For various sets of EL panels having different surface area including from (A1+A1) to G, the EL operating efficacy was about 3 to 4 lumen/watt. In the prior art, the EL operating efficacy was less than 1 lumen/watt.

Next, similar lighting experiments were done using an EL operating device having the fundamental circuit arrangement shown in FIG. 11, finding further improved EL operating efficacy.

The benefits of the present invention are evident from these results.

I claim:

1. A light emitting power supply circuit having a series-coupled component, said component comprising:
an input power source;
a load circuit;
an inverter circuit including output terminals coupled to at least one end of said load circuit, and further including a positive switch device and a negative switch device, said positive and negative switch devices each having a zero-crossing switching mechanism for automatically closing a channel thereof when a current supplied thereto from said input power source becomes zero, said positive and negative switch devices each being provided with a bypass channel having a reverse current bypass diode for bypassing the zero-crossing switching mechanism;
wherein said input power source supplies current to said positive and negative switch devices in an alternating manner and each half cycle phase of the alternating current is latched by one of the reverse current bypass diodes at a secondary zero-crossing phase point of the alternating current, said secondary zero-crossing phase point being determined by circuit constants of the power supply circuit.

2. The light emitting power supply circuit according to claim 1, wherein said load circuit includes an inductor and an electroluminescent element or EL array having capacitive load characteristics.

3. The light emitting power supply circuit according to claim 1, wherein said load circuit includes an inductor, a bipolar capacitor, and a diode circuit for supplying bidirectional current to a light emitting diode or a laser diode.

4. The light emitting power supply circuit according to claim 1, wherein said load circuit includes an inductor, an electroluminescent device or EL array having capacitive load characteristics, and a diode circuit.

5. The light emitting power supply circuit according to claim 1, wherein said zero-crossing switching mechanism of each of said positive and negative switch devices comprises a track element.

6. The light emitting power supply circuit according to claim 1, wherein said input power source is a single pulse oscillator means.

7. The light emitting power supply circuit according to claim 6, further including positive and negative pulse selectors for generating said alternating current which is applied to said zero-crossing switching mechanisms of said positive and negative switch devices.

* * * * *

UNITED STATES PATENT AND TRADEMARK OFFICE
CERTIFICATE OF CORRECTION

PATENT NO. : 5,323,305
DATED : June 21, 1994
INVENTOR(S) : Takaaki IKEDA, et al.

It is certified that error appears in the above-indentified patent and that said Letters Patent is hereby corrected as shown below:

On the title page, Item [87], the PCT Publication Number should read as follows:

--WO91/12703--

Signed and Sealed this

Eighteenth Day of October, 1994

Attest:

BRUCE LEHMAN

Attesting Officer

Commissioner of Patents and Trademarks